United States Patent
Kitamura et al.

(10) Patent No.: US 8,749,862 B2
(45) Date of Patent: Jun. 10, 2014

(54) METHOD FOR PREPARING A HOLOGRAM RECORDING MEDIUM

(75) Inventors: Mitsuru Kitamura, Tokyo (JP); Hidekazu Okuno, Tokyo (JP); Masato Taninaka, Tokyo (JP)

(73) Assignee: Dai Nippon Printing Co., Ltd, Tokyo (JP)

( * ) Notice: Subject to any disclaimer, the term of this patent is extended or adjusted under 35 U.S.C. 154(b) by 0 days.

(21) Appl. No.: 13/180,067

(22) Filed: Jul. 11, 2011

(65) Prior Publication Data

US 2011/0267664 A1 Nov. 3, 2011

Related U.S. Application Data

(62) Division of application No. 11/712,012, filed on Feb. 28, 2007, now abandoned.

(30) Foreign Application Priority Data

Mar. 15, 2006 (JP) ................................. 2006-070877

(51) Int. Cl.
*G03H 1/08* (2006.01)

(52) U.S. Cl.
CPC .................................. *G03H 1/0891* (2013.01)
USPC ............................................................. 359/9

(58) Field of Classification Search
None
See application file for complete search history.

(56) References Cited

U.S. PATENT DOCUMENTS

| 5,784,200 A | 7/1998 | Modegi |
| 6,618,190 B2 | 9/2003 | Kitamura et al. |
| 6,934,074 B2 | 8/2005 | Kitamura et al. |
| 7,221,496 B2 | 5/2007 | Kitamura |
| 7,573,622 B2 | 8/2009 | Kitamura |
| 2004/0027625 A1* | 2/2004 | Trentler et al. .................... 359/3 |

FOREIGN PATENT DOCUMENTS

| JP | 8-220468 A | | 8/1996 |
| JP | 8-265566 A | | 10/1996 |
| JP | 2001083866 A | * | 3/2001 |
| JP | 2003-186376 | | 7/2003 |
| WO | WO 9502200 A1 | | 1/1995 |
| WO | WO 9504948 A1 | | 2/1995 |
| WO | WO 2006061586 A2 | | 6/2006 |

OTHER PUBLICATIONS

English Machine Translation of JP 2001-83866 A. Retrieved Jul. 1, 2013.*

(Continued)

*Primary Examiner* — Derek S Chapel
(74) *Attorney, Agent, or Firm* — Ladas & Parry LLP

(57) ABSTRACT

Two original images to be recorded are prepared as data (S10). A plurality of unit regions, each having an adequate area to record interference fringes of visible light, are defined and positioned on a hologram recording surface (S20). A gradation pattern, with which appearance probabilities of two record attributes gradually change in space, is overlapped onto the recording surface, and to each unit region, one of either record attributes is assigned according to the appearance probabilities of the respective record attributes at each individual position (S30). In each unit region, to which the first record attribute is assigned, the first original image is recorded as an interference fringe pattern, a diffraction grating pattern, or a scattering structure pattern, and in each unit region, to which the second record attribute is assigned, the second original image is recorded as an interference fringe pattern, a diffraction grating pattern, or a scattering structure pattern (S40), and a record pattern is formed on a physical medium (S50).

1 Claim, 13 Drawing Sheets

(56) References Cited

OTHER PUBLICATIONS

Office Action issued on Oct. 25, 2010 from the Japanese Patent Office in connection with counterpart Japanese application 2006-070877.

Espacenet English abstract of JP 8-265566 A, Retrieved Jan. 11, 2011.

Espacenet English abstract of JP 8-220468 A, Retrieved Jan. 11, 2011.

* cited by examiner

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
|   | A | A | A | A | A | A | A | A | B | B  | B  | B  | B  | B  | B  | B  |
|   | A | A | A | A | A | A | B | A | B | B  | B  | B  | B  | B  | B  | B  |
|   | A | A | A | A | A | B | A | B | A | B  | B  | B  | B  | B  | B  | B  |
|   | A | A | A | A | B | A | B | A | B | A  | B  | B  | B  | B  | B  | B  |
|   | A | A | A | B | A | B | A | B | A | B  | A  | B  | B  | B  | B  | B  |
|   | A | A | A | A | A | B | A | B | B | B  | B  | B  | B  | B  | B  | B  |
|   | A | A | A | A | B | A | B | A | B | B  | B  | B  | B  | B  | B  | B  |
|   | A | A | A | A | B | A | B | A | B | A  | B  | B  | B  | B  | B  | B  |

0 — $\frac{1}{4}L$ — $\frac{2}{4}L$ — $\frac{3}{4}L$ — L

TABLE DEFINING THE DISTRIBUTION FACTOR f

IF A IS TO BE ASSIGNED WHEN THE DITHER MASK VALUE IS NO LESS THAN 8, AND B IS TO BE ASSIGNED WHEN THE DITHER MASK VALUE IS NO MORE THAN 7:

|   |   |   |   |   |
|---|---|---|---|---|
|   | B | A | A | B |
|   | B | B | B | A |
|   | A | A | A | B |
|   | B | A | B | A |
|   | B | A | A | B |
|   | B | B | B | A |
|   | A | A | A | B |
|   | B | A | B | A |

DIFFRACTION GRATING PATTERN

METHOD FOR PREPARING A HOLOGRAM RECORDING MEDIUM

RELATED APPLICATION

This is a divisional of copending application Ser. No. 11/712,012 filed on Feb. 28, 2007 now abandoned, claims the benefit thereof, and incorporates the same by reference.

BACKGROUND OF THE INVENTION

The present invention relates to a method for preparing a hologram recording medium and particularly relates to a method for preparing a hologram recording medium, with which a gradated motif expression is enabled by computation using a computer.

Holograms are widely used in applications for preventing counterfeiting of cash vouchers and credit cards. Normally, a region onto which a hologram is to be recorded is set up in a portion of a medium to be subject to counterfeiting prevention, and a hologram of a three-dimensional image, etc., is recorded inside this region.

Although conventionally with many commercially utilized holograms, an original image is recorded onto a medium in the form of interference fringes by an optical method, methods for preparing a hologram by forming interference fringes on a recording surface by computation using a computer have come to be known recently. A hologram prepared by such a method is generally referred to as a "computer generated hologram (CGH)" or simply as a "computer hologram." A computer hologram is obtained by simulating a so-called optical interference fringe generating process on a computer, and an entire process of generating interference fringe patterns is carried out as computation on the computer. Upon obtaining image data of interference fringe patterns by such a computation, physical interference fringes are formed on an actual medium based on the image data. As a specific example, a method, with which image data of interference fringe patterns prepared by a computer are provided to an electron beam drawing equipment and physical interference fringes are formed by scanning an electron beam across a medium, has been put to practical use.

With the advance of computer graphics technologies, the handling of various images on computers is becoming a general practice in the printing industry. It will thus be convenient to be able to prepare original images, to be recorded as holograms, in the form of image data obtained using a computer. To answer such demands, arts for preparing computer holograms are becoming important and are anticipated to take the place of optical hologram preparing methods in the future. Various arts related to such computer holograms are disclosed in Japanese Patent Publications No. 11-024539A, No. 2001-109362A and No. 2003-186376A (hereinafter Patent Documents 1, 2 and 3).

Also, although "hologram" normally refers to an optical interference fringe pattern that enables reproduction of a three-dimensional pattern, recently, a medium called a "pseudo hologram," in which a diffraction grating pattern is formed in place of an optical interference fringe pattern, has come to be used popularly. For example, Japanese Patent Publications No. 06-337622A, No. 07-146635A and No. 07-146637A (hereinafter Patent Documents 4, 5 and 6) disclose methods for preparing a "pseudo hologram," with which a predetermined motif is expressed by arraying diffraction grating patterns of various types as pixels, by using a computer, and Japanese Patent Publication No. 2001-083866A (hereinafter Patent Document 7) discloses a method for recording such a "pseudo hologram" and a "normal hologram" on the same medium. Also, Japanese Patent Publications No. 2002-328639A and No. 2002-333854A (hereinafter Patent Documents 8 and 9) disclose examples of pseudo holograms that use scattering structure patterns instead of diffraction grating patterns.

As mentioned above, although a normal "hologram" refers to an arrangement with which optical interference fringes of an object light and a reference light are recorded on a medium, recently, media, with which various motifs are expressed by diffraction grating patterns or scattering structure patterns, are also coming to be referred to generally as "holograms." Thus, in the present Application, the term "hologram" shall be used as a broad concept that includes not only normal holograms, formed of optical interference fringe patterns, but also includes pseudo holograms formed of diffraction grating patterns (diffraction grating recording media) and pseudo holograms formed of scattering structure patterns (scattering structure recording media).

In a hologram for a cash voucher or credit card, various motifs, such as a company logo mark, a character string indicating a company name, etc., are recorded according to application. Methods for superposingly recording a plurality of motifs on the same hologram recording medium have thus been proposed. Because both normal holograms, in which optical interference fringe patterns are recorded, and pseudo holograms, in which diffraction grating patterns are recorded, have a function of making use of the diffraction phenomenon of light to generate reproduction light, directed in specific directions, two motifs can be recorded superposingly in a manner such that a first motif is observed upon observation from a first direction and a second motif is observed upon observation from a second direction. For example, the abovementioned Patent Documents 2 and 3 disclose methods for superposingly recording information of a plurality of original images onto the same recording medium, and the abovementioned Patent Document 4 discloses a method for superposingly recording diffraction grating patterns for indicating two different alphabetical characters.

When two motifs can thus be recorded superposingly, the two motifs can be displayed switchingly according to the observation direction so that, for example, a motif, constituted of a character string indicating a company name, is observed upon observation from a first direction, and a motif, constituted of a company logo mark, is observed upon observation from a second direction. However, depending on the application, such a method of switching according to observation direction may not necessarily be appropriate. For example, there are cases where it is preferable for both the character string indicating the company name and the company logo mark to be displayed next to each other at the same time.

Such cases are conventionally accommodated by simply positioning the two motifs adjacently. For example, the abovementioned Patent Document 7 discloses an art of recording a first motif as an optical interference fringe pattern onto a central region of a medium and positioning a second motif as a diffraction grating pattern at a peripheral region of the medium. However, when a plurality of motifs are simply positioned adjacently in this manner, the motifs do not blend well with each other and the resulting hologram lacks design quality.

SUMMARY OF THE INVENTION

Thus, an object of the present invention is to provide a method for preparing a hologram recording medium, with which good blending can be secured among recorded motifs by a gradated motif expression.

(1) The first feature of the present invention resides in a hologram recording medium preparing method comprising:

an original image preparing step of preparing, as data, a specific original image to be recorded;

a unit region defining step of defining and positioning a plurality of unit regions, each having an adequate area for recording interference fringes of visible light, on a hologram recording surface;

an attribute assigning step of assigning a specific record attribute, which indicates that the specific original image is to be recorded, to a portion of the plurality of unit regions;

a record pattern preparing step of determining, for each unit region assigned with the specific record attribute, an interference fringe pattern, a diffraction grating pattern, or a scattering structure pattern based on the specific original image to prepare data indicating a predetermined record pattern to be formed on the recording surface; and a medium forming step of forming the record pattern on a physical medium.

(2) The second feature of the present invention resides in a hologram recording medium preparing method comprising:

an original image preparing step of preparing, as data, a specific original image to be recorded;

a unit region defining step of defining and positioning a plurality of unit regions, each having an adequate area for recording interference fringes of visible light, on a hologram recording surface;

an attribute assigning step of defining a gradation pattern, which expresses that an appearance probability of a predetermined attribute gradually changes in space, and assigning a specific record attribute, which indicates that the specific original image is to be recorded, to a portion of the unit regions that is selected according to an appearance probability at each position when the gradation pattern is overlapped onto the recording surface;

a record pattern preparing step of determining, for each unit region assigned with the specific record attribute, an interference fringe pattern, a diffraction grating pattern, or a scattering structure pattern based on the specific original image to prepare data indicating a predetermined record pattern to be formed on the recording surface; and a medium forming step of forming the record pattern on a physical medium.

(3) The third feature of the present invention resides in a hologram recording medium preparing method comprising:

an original image preparing step of preparing, as data, a plurality M of original images to be recorded;

a unit region defining step of defining and positioning a plurality of unit regions, each having an adequate area for recording interference fringes of visible light, on a hologram recording surface;

an attribute assigning step of defining a gradation pattern for each of the M original images, respectively, which expresses that an appearance probability of a record attribute corresponding to an original image gradually changes in space, and assigning any one of record attributes to each unit region according to appearance probabilities of the respective record attributes at each individual position when the respective gradation patterns are overlapped onto the recording surface;

a record pattern preparing step of determining, for each individual unit region, an interference fringe pattern, a diffraction grating pattern, or a scattering structure pattern based on a specific original image corresponding to an assigned record attribute to prepare data indicating a predetermined record pattern to be formed on the recording surface; and a medium forming step of forming the record pattern on a physical medium.

(4) The fourth feature of the present invention resides in a hologram recording medium preparing method comprising:

an original image preparing step of preparing, as data, a first original image and a second original image to be recorded;

a unit region defining step of defining and positioning a plurality of unit regions, each having an adequate area for recording interference fringes of visible light, on a hologram recording surface;

an attribute assigning step of defining a gradation pattern, which expresses that an appearance probability of a first record attribute and an appearance probability of a second record attribute gradually change in space, and performing a process of assigning one of either the first record attribute or the second record attribute or not assigning either attribute on each unit region according to appearance probabilities of the respective record attributes at each individual position when the gradation pattern is overlapped onto the recording surface;

a record pattern preparing step of determining an interference fringe pattern, a diffraction grating pattern, or a scattering structure pattern based on the first original image for each unit region to which the first record attribute was assigned, and determining an interference fringe pattern, a diffraction grating pattern, or a scattering structure pattern based on the second original image for each unit region to which the second record attribute was assigned to prepare data indicating a predetermined record pattern to be formed on the recording surface; and a medium forming step of forming the record pattern on a physical medium.

(5) The fifth feature of the present invention resides in a hologram recording medium preparing method according to the fourth feature, wherein the attribute assigning step in turn comprises:

a reference setting step of defining a distance reference line on a plane containing the recording surface;

a distribution factor setting step of defining a distribution factor $f(x)$ as a function of a distance x that takes on values in a range of $0 \leq f(x) \leq 1$; and an attribute determining step of determining a record attribute to be assigned to each unit region in a manner such that, to unit regions, positioned on or near a positioning line, which is parallel to and is at a position separated from the distance reference line by just a distance x, the first record attribute is assigned at a proportion of $f(x)$ and the second record attribute is assigned at a proportion of "$1-f(x)$" or less.

(6) The sixth feature of the present invention resides in a hologram recording medium preparing method according to the fourth feature, wherein the attribute assigning step in turn comprises:

a reference setting step of defining a distance reference point on a plane containing the recording surface;

a distribution factor setting step of defining a distribution factor $f(x)$ as a function of a distance x that takes on values in a range of $0 \leq f(x) \leq 1$; and an attribute determining step of determining a record attribute to be assigned to each unit region in a manner such that, to unit regions, positioned on or near a positioning line, which is defined as a circumference of a circle of a radius x that is centered about the distance reference point, the first record attribute is assigned at a proportion of f(x) and the second record attribute is assigned at a proportion of "1−f(x)" or less.

(7) The seventh feature of the present invention resides in a hologram recording medium preparing method according to the fourth feature, wherein the attribute assigning step in turn comprises:

a reference setting step of defining an angle reference point and an angle reference line, passing through the angle reference point, on a plane containing the recording surface;

a distribution factor setting step of defining a distribution factor f(x) as a function of an angle x that takes on values in a range of 0≤f(x)≤1; and an attribute determining step of determining a record attribute to be assigned to each unit region in a manner such that, to unit regions, positioned on or near a positioning line, which passes through the angle reference point and is inclined by just an angle x with respect to the angle reference line, the first record attribute is assigned at a proportion of f(x) and the second record attribute is assigned at a proportion of "1−f(x)" or less.

(8) The eighth feature of the present invention resides in a hologram recording medium preparing method according to the fifth to seventh features, wherein in the distribution factor setting step, a monotonously increasing function or a monotonously decreasing function is used as the distribution factor f(x).

(9) The ninth feature of the present invention resides in a hologram recording medium preparing method according to the fifth to seventh features, wherein in the attribute determining step, for a plurality N of unit regions positioned on a same positioning line, a process of using random numbers to assign the first record attribute to N×f(x) unit regions and assign the second record attribute to the remaining unit regions is performed.

(10) The tenth feature of the present invention resides in a hologram recording medium preparing method according to the fifth to seventh features, wherein in the attribute determining step, an integer ratio α:β that approximates "f(x)": "1−f(x)" is determined for each individual positioning line, and for (α+β) successive unit regions among a plurality of unit regions positioned on a single positioning line, the first record attribute is assigned to α unit regions and the second record attribute is assigned to β unit regions.

(11) The eleventh feature of the present invention resides in a hologram recording medium preparing method according to the fourth feature, wherein the attribute assigning step in turn comprises:

a reference setting step of defining a two-dimensional XY coordinate system on a plane containing the recording surface;

a distribution factor setting step of defining a distribution factor f(x, y) as a function of two variables x and y of the two-dimensional XY coordinate system that takes on values in a range of 0≤f(x, y)≤1; and an attribute determining step of determining position coordinates (x, y) for the respective unit regions and determining record attributes to be assigned to the respective unit regions in a manner such that the first record attribute is assigned at a proportion of f(x, y) and the second record attribute is assigned at a proportion of "1−f(x, y)" or less.

(12) The twelfth feature of the present invention resides in a hologram recording medium preparing method according to the fourth feature, wherein the attribute assigning step in turn comprises:

a distribution factor setting step of preparing a table that defines a distribution factor f, taking on values in a range of 0≤f≤1, for each individual unit region; and an attribute determining step of determining record attributes to be assigned to the respective unit regions in a manner such that with each unit region, the first record attribute is assigned at a proportion of f defined by the table and the second record attribute is assigned at a proportion of "1−f" or less.

(13) The thirteenth feature of the present invention resides in a hologram recording medium preparing method according to the first to twelfth features, wherein in the unit region defining step, a plurality of unit regions, having a same size and same rectangular shape and arrayed in a form of a two-dimensional matrix, are defined.

(14) The fourteenth feature of the present invention resides in a hologram recording medium preparing method according to the thirteenth feature, wherein in the attribute determining step, a dithering process using a dither mask, comprising an array adapted to the matrix of unit regions, is performed to determine record attributes of the respective individual unit regions.

(15) The fifteenth feature of the present invention resides in a hologram recording medium preparing method according to the thirteenth feature, wherein in the attribute determining step, a process using an error diffusion method is performed to determine record attributes of the respective individual unit regions.

(16) The sixteenth feature of the present invention resides in a hologram recording medium preparing method according to the first to fifteenth features, wherein in the original image preparing step, digital data, expressing a two-dimensional image or a three-dimensional image, are prepared as an original image.

(17) The seventeenth feature of the present invention resides in a hologram recording medium preparing method according to the third to sixteenth features, wherein in the original image preparing step, an empty image without an actual entity is prepared as one of the original images and no pattern whatsoever is formed for unit regions that have been assigned a record attribute of the empty image.

(18) The eighteenth feature of the present invention resides in a hologram recording medium preparing method according to the first to seventeenth features, wherein in determining an interference fringe pattern based on an original image for a unit region in the record pattern preparing step, an original image and the recording surface are positioned in a three-dimensional space, a predetermined reference light is defined, and the interference fringe pattern, formed in the unit region by an object light from the original image and the reference light, is determined by computation.

(19) The nineteenth feature of the present invention resides in a hologram recording medium preparing method according to the first to seventeenth features, wherein in determining a diffraction grating pattern or a scattering structure pattern based on an original image for a unit region in the record pattern preparing step, one or a plurality of pixels are defined in the unit region, a corresponding pixel or pixels on the original image is or are determined for the defined pixel or pixels, and a diffraction grating pattern or a scattering structure pattern in each individual defined pixel is determined based on a pixel value of the corresponding pixel.

(20) The twentieth feature of the present invention resides in a hologram recording medium preparing method according to the fourth to fifteenth features, wherein in the record pattern preparing step, the first original image, the second original image, and the recording surface are positioned in a three-dimensional space, a predetermined reference light is defined, an interference fringe pattern of object light from the first original image and the reference light is determined by computation for each unit region, to which the first record attribute is assigned, and an interference fringe pattern of object light from the second original image and the reference light is determined by computation for each unit region, to which the second record attribute is assigned.

(21) The twenty-first feature of the present invention resides in a hologram recording medium preparing method according to the fourth to fifteenth features, wherein in the record pattern preparing step, the first original image and the recording surface are positioned in a three-dimensional space, a predetermined reference light is defined, and an interference fringe pattern of object light from the first original image and the reference light is determined by computation for each unit region to which the first record attribute is assigned, and for each unit region to which the second record attribute is assigned, one or a plurality of pixels is or are defined in a unit region, a corresponding pixel or pixels on the second original image is or are determined for the defined pixel or pixels, and a diffraction grating pattern or a scattering structure pattern in each individual defined pixel is determined based on a pixel value of the corresponding pixel.

(22) The twenty-second feature of the present invention resides in a hologram recording medium preparing method according to the fourth to fifteenth features, wherein in the record pattern preparing step, for each unit region to which the first record attribute is assigned, one or a plurality of pixels is or are defined in the unit region, a corresponding pixel or pixels on the first original image is or are determined for the defined pixel or pixels, and a diffraction grating pattern or a scattering structure pattern in each individual defined pixel is determined based on a pixel value of the corresponding pixel, and for each unit region to which the second record attribute is assigned, one or a plurality of pixels is or are defined in the unit region, a corresponding pixel or pixels on the second original image is or are determined for the defined pixel or pixels, and a diffraction grating pattern or a scattering structure pattern in each individual defined pixel is determined based on a pixel value of the corresponding pixel.

(23) The twenty-third feature of the present invention resides in a hologram recording medium preparing method according to the first to twenty-second features, wherein a size of each unit region is set to a size, by which the presence of each individual unit region cannot be recognized by a naked eye.

(24) The twenty-fourth feature of the present invention resides in a computer program, having a function of making a computer execute the process of the attribute assigning step and the process of the record pattern preparing step of hologram recording medium preparing method according to the first to twenty-third features;

on the basis of digital data, expressing an original image prepared in the original image preparing step of the preparing method according to the first to twenty-third features, and digital data, expressing the unit regions defined in the unit region defining step of the preparing method according to the first to twenty-third features.

(25) The twenty-fifth feature of the present invention resides in a hologram recording medium, prepared by the preparing method according to the first to twenty-third features.

(26) The twenty-sixth feature of the present invention resides in a hologram recording medium preparing device comprising:

an original image storage unit, storing, as data, a plurality M of original images to be recorded;

a unit region defining unit, defining and positioning a plurality of unit regions, each having an adequate area for recording interference fringes of visible light, on a hologram recording surface;

an attribute assigning unit, assigning a record attribute to each unit region according to appearance probabilities of respective record attributes at each individual position when a gradation pattern for each of the M original images, which expresses that an appearance probability of a record attribute corresponding to an original image changes gradually in space, is overlapped onto the recording surface; and a record pattern preparing unit, determining, for each individual unit region, an interference fringe pattern, a diffraction grating pattern, or a scattering structure pattern based on a specific original image corresponding to an assigned record attribute to prepare data indicating a predetermined record pattern to be formed on the recording surface.

(27) The twenty-seventh feature of the present invention resides in a hologram recording medium, having a recording surface, on which a plurality of unit regions, each having an adequate area for recording interference fringes of visible light, are defined, and wherein image information concerning one original image, among a plurality M of original images, is recorded as an interference fringe pattern, a diffraction grating pattern, or a scattering structure pattern in each unit region, and appearance probabilities of unit regions, in which image information concerning the respective original images are recorded, change in space.

(28) The twenty-eighth feature of the present invention resides in a hologram recording medium, having a recording surface, on which a plurality of unit regions, each having an adequate area for recording interference fringes of visible light, are defined, and wherein either image information concerning a first original image or image information concerning a second original image is recorded as an interference fringe pattern, a diffraction grating pattern, or a scattering structure pattern in each unit region, and an appearance probability of unit regions, having a first record attribute and in which image information concerning the first original image is recorded, and an appearance probability of unit regions, having a second record attribute and in which image information concerning the second original image is recorded, gradually change in space.

With the hologram recording medium preparing method according to the present invention, gradated motif expression is enabled to enable good blending to be secured among the motifs. In particular, even when a plurality of motifs are recorded upon being positioned adjacently, because gradation can be applied to the boundary portions, a design expression such that the plurality of motifs are blended at the boundary portions is made possible.

BEST MODES FOR CARRYING OUT THE INVENTION

The present invention shall now be described based on the illustrated embodiments.

<<<Section 1. Basic Embodiment>>>

Figure 1:
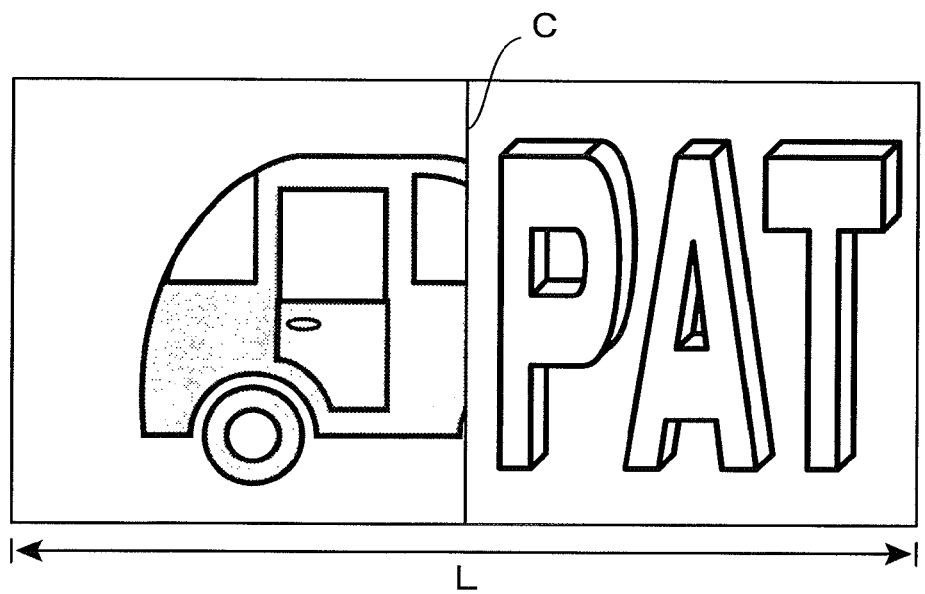
FIG. 1 is a plan view of an example of a conventional hologram recording medium, in which two motifs are expressed upon simply being positioned adjacently.

First, basic concepts of the present invention shall be described. FIG. 1 is a plan view of an example of a conventional hologram recording medium, in which two motifs are expressed upon being positioned adjacently. A boundary line C is set at a position at approximately half of a transverse width L of the hologram recording medium, a motif of an automobile is recorded in a left half, and a motif of three-dimensional characters of "PAT" is recorded in a right half. This recording medium is thus formed by positioning the medium of the left half, in which the automobile motif is recorded, and the medium of the right half, in which the three-dimensional character motif is recorded, next to each other across the boundary line C. Such a recording medium can be prepared by a general, conventional hologram recording medium preparing method. Conventionally, such a method for recording two motifs by partitioning by a contour line C is employed, for example, in a case where a company logo mark and a character string indicating a company name are to be recorded respectively as motifs positioned next to each other at left and right sides.

However, as mentioned above, when a plurality of motifs are simply positioned adjacently in this manner, the motifs do not blend well with each other and the resulting hologram lacks design quality. The present invention proposes a new method for improving the design quality by securing blending of recorded motifs by carrying out a gradated motif expression.

Figure 2:
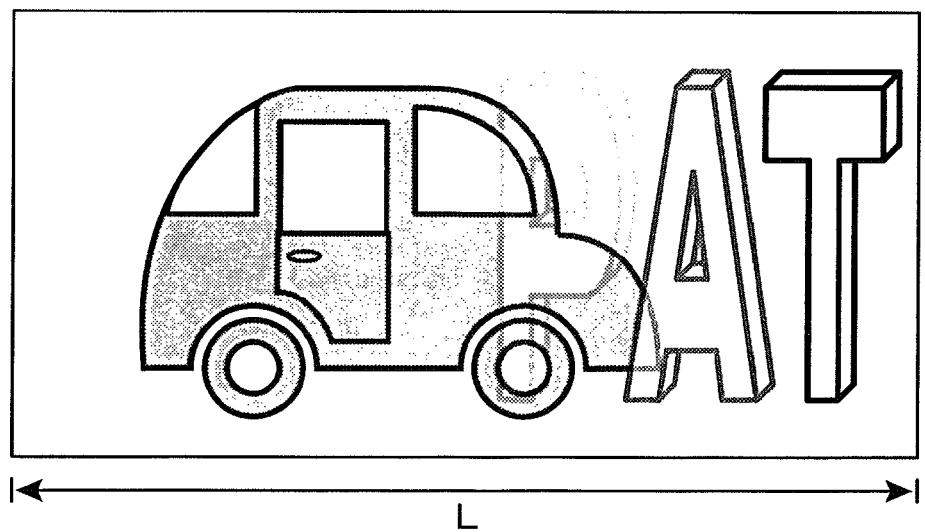
FIG. 2 is a plan view of an example of a hologram recording medium, with which a gradated expression is applied to boundary portions of two motifs by a method according to the present invention.

FIG. 2 is a plan view of an example of a hologram recording medium, with which a gradated expression is applied to boundary portions of two motifs by a method according to the present invention. Although in the recording medium shown in FIG. 2, the automobile motif and the three-dimensional character motif of "PAT" are recorded as in the recording medium shown in FIG. 1, the boundary between the two motifs is not clear and the motifs are expressed so as to blend near a central portion. This is a result of applying a gradated expression to a right portion of the automobile motif and to a left portion of the three-dimensional character motif. From a comparison with the conventional recording medium, shown in FIG. 1, it can be understood that with the recording medium according to the present invention, shown in FIG. 2, the two motifs are mixed as if dissolving into each other, and blending of both motifs is secured so that a design that is integral as a whole is realized.

With general images (images that are not recorded as interference fringe patterns or diffraction grating patterns), image processing arts by which two motifs are gradually blended by applying gradation as shown in FIG. 2 have been practiced of old. To blend two pieces of digital image data, a method called $\alpha$-blending is generally used. In this method, when two images are overlapped, the pixel value of a pixel at a position of mutual overlap is determined by synthesis at a ratio of: "$\alpha:(1-\alpha)$" (where $0 \leq \alpha \leq 1$). For example, to synthesize a pixel value Pa of an image A and a pixel value Pb of an image B to determine a new, synthesized pixel value, the new pixel value Pc is determined by the formula: "$Pc = \alpha \cdot Pa + (1-\alpha) \cdot Pb$." By gradually changing the value of $\alpha$ in space, two images can be blended as shown in FIG. 2.

However, in the case of a hologram recording medium, this $\alpha$-blending method for a general, planar image cannot be applied as it is. This is because whereas a general planar image is observed as a distribution of densities or luminances of the respective individual pixels, in the case of hologram recording medium, a reproduction image is observed due to diffracted light that results from diffraction by an interference fringe pattern or a diffraction grating pattern recorded on the medium and propagates toward a viewpoint direction. Even if, in actually recording a synthetic image of an image A and an image B as a hologram onto a medium, a method of simply overlapping the interference fringe pattern or the diffraction grating pattern of both images is employed, recording cannot be performed in a manner such that a clear reproduction image for practical purposes is obtained.

Figure 3:
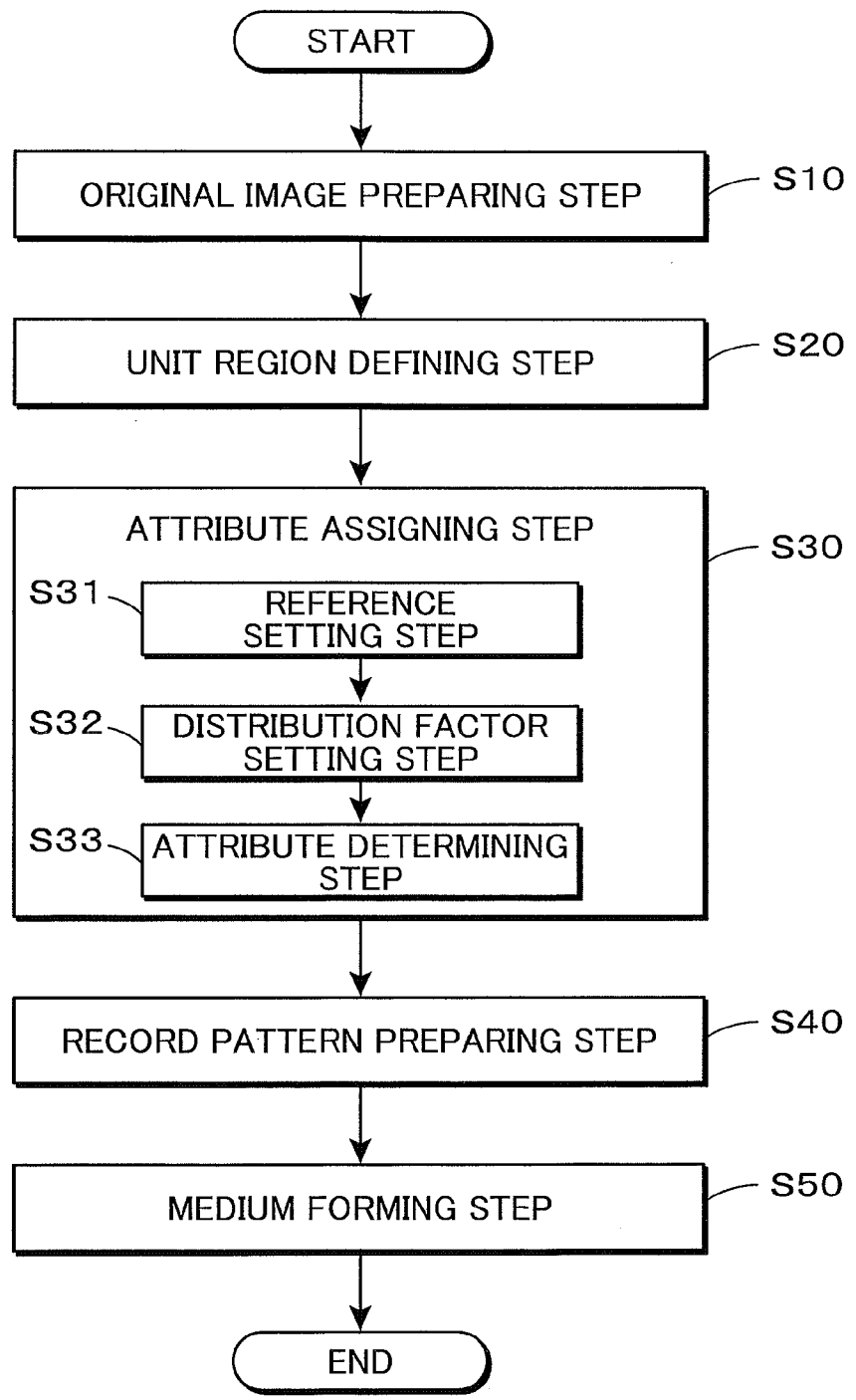
FIG. 3 is a flowchart of a hologram recording medium preparing method according to a basic embodiment of the present invention.

The present invention proposes a new method that enables a gradated motif expression, such as that shown in FIG. 2, to be carried out on a hologram recording medium. A procedure of a hologram recording medium preparing method according to a basic embodiment of the present invention shall now be described with reference to a flowchart of FIG. 3. The basic procedure shown in FIG. 3 is constituted of an original image preparing step (S10), a unit region defining step (S20), an attribute assigning step (S30), a record pattern preparing step (S40), and a medium forming step (S50). Specific processing details of these respective steps shall now be described in line with an example of preparing the recording medium shown in FIG. 2.

Figure 4A:
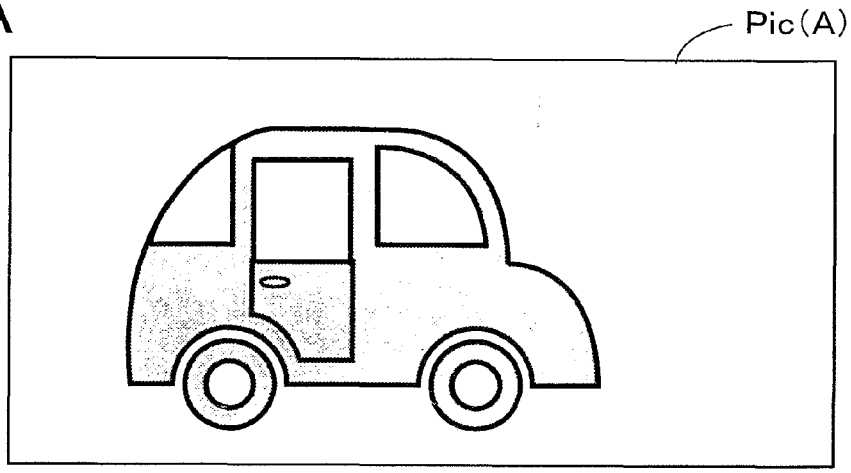
FIG. 4A and FIG. 4B are front views of two original images that are to be recorded by the method according to the present invention.
Figure 4B:
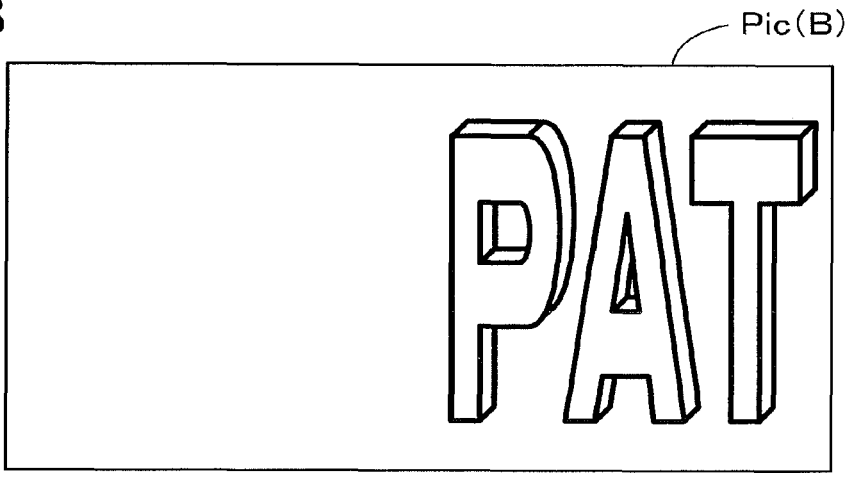

As mentioned above, two types of motifs are recorded in the recording medium shown in FIG. 2. Thus, in the "original image preparing step" of step S10, a first original image and a second original image that are to be recorded are prepared as data. The two pieces of original image data correspond to the respective motifs. FIG. 4A shows a first original image Pic(A) for expressing the automobile motif (although a front view is shown in the figure, the image is actually a three-dimensional image with the shape of an automobile), and FIG. 4B shows a second original image Pic(B) for expressing the three-dimensional characters of "PAT." These pieces of data that express the original images are both prepared as digital data. Here, it shall be deemed that the respective original images Pic(A) and Pic(B) are prepared as data of three-dimensional objects defined in a three-dimensional XYZ coordinate system. Although a three-dimensional object is normally expressed as data of a form expressing a collection of a plurality of polygons, the data form of the original image data prepared here may be any data form.

Figure 4C:
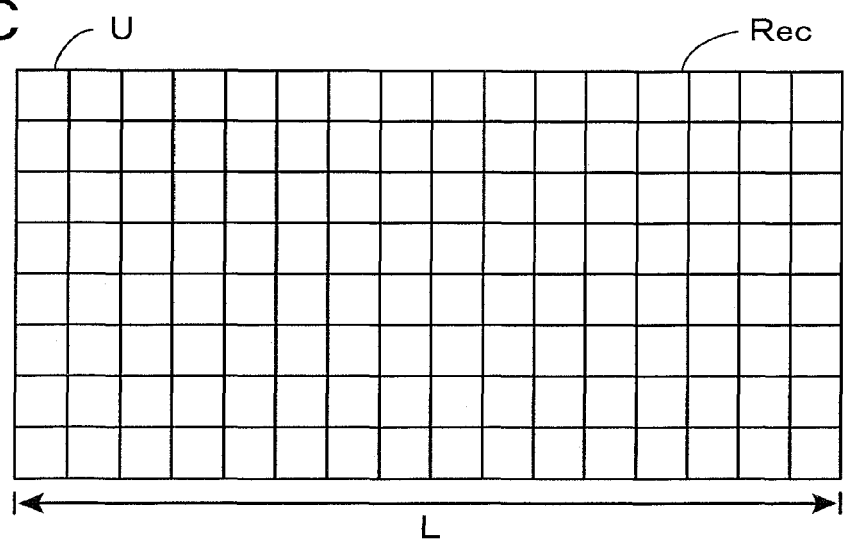
FIG. 4C is a front view of a recording surface, on which a plurality of unit regions are defined.

The "unit region defining step" of step S20 is carried out next. Here, a process of defining and positioning a plurality of unit regions, each having an adequate area for recording visible light interference fringes, on a hologram recording surface is performed. FIG. 4C shows an example of a plurality of unit regions U defined on a recording surface Rec. In the illustrated example, a plurality of unit regions, arrayed in a two-dimensional matrix form and each having the same size and same rectangular shape (a square shape in the present example), are defined. Although the individual unit regions do not necessarily have to be the same in size and shape, for practical use, it is preferable to array unit regions of the same size and same shape because the process is then simplified. Also, although a hexagon, triangle, etc., may be employed as the shape of each unit region, for practical use, it is preferable to array unit regions of rectangular shape in a two-dimensional matrix form as in the illustrated example.

As shall be described later, an independent interference fringe pattern or diffraction grating pattern is to be recorded in the interior of each individual unit region U, and thus, during observation of the medium, visible light must be made to undergo a predetermined diffraction phenomenon in each individual unit region U and propagate toward a viewpoint position. Each unit region must thus have an adequate area for recording interference fringes of visible light.

In general, it is deemed that at least approximately five fringes are required to give rise to an optically adequate diffraction phenomenon. Here, if the wavelength of red light at the long wavelength side is 650 nm and the pitch of fringes suitable for diffraction of red light is the same 650 nm as the wavelength, a width of 650 nm×5=3.25 µm is needed to position five fringes. Thus, in regard to the size of a unit region U, a region of at least 3.25 µm×3.25 µm is necessary.

Meanwhile, as shall be described later, information of mutually different original images must be recorded in adjacent unit regions U. Thus, if each individual unit region U becomes large enough to be recognized by the naked eye, boundaries between unit regions will be observed by the naked eye at portions of adjacent unit regions in which the information of mutually different original images are recorded and make the observed image look awkward. It is thus preferable to limit the maximum size of each individual unit region U to a size such that the presence of each individual unit region U cannot be recognized by the naked eye. Specifically, it is deemed that even if an array of a plurality of cells is present, if the dimension of each cell is no more than 300 µm, it is significantly difficult to recognize the cell array by the resolution of the naked eye. The size of each unit region U defined in the present invention is thus preferably set to 300 µm at the most.

The size of each unit region U defined in step S20 is thus preferably set in the range of 3.25 µm to 300 µm. With the embodiment described here, the unit regions U of square shape are positioned in a two-dimensional matrix form as shown in FIG. 4C, and a single unit region U is set as a square of 20 µm×20 µm. Although for the sake of illustration, a unit region array of 8 rows and 16 columns is shown in FIG. 4C, an array, formed of a larger number of unit regions, is defined in actuality. By defining unit regions of such size, each unit region is made to have an adequate area for recording interference fringes of visible light and yet individual unit regions are not recognized by naked eye observation.

The hologram recording surface, on which the unit regions U are defined in step S20, is merely a conceptual, geometrical recording surface at this step. Of the respective steps shown in FIG. 3, the processes up to that of the "record pattern preparing step" of step S40 are actually processes carried out inside a computer. Therefore, the unit region definition process in step S20 is also actually a process of setting up individual unit regions on a conceptual recording surface on a computer.

The "attribute assigning step" of step S30 is carried out next. An example, in which this step S30 is constituted of procedures of the three steps of a "reference setting step" of S31, a "distribution factor setting step" of step S32, and an "attribute determining step" of step S33, is shown, and these detailed procedures shall be described in Section 2.

Figure 5:
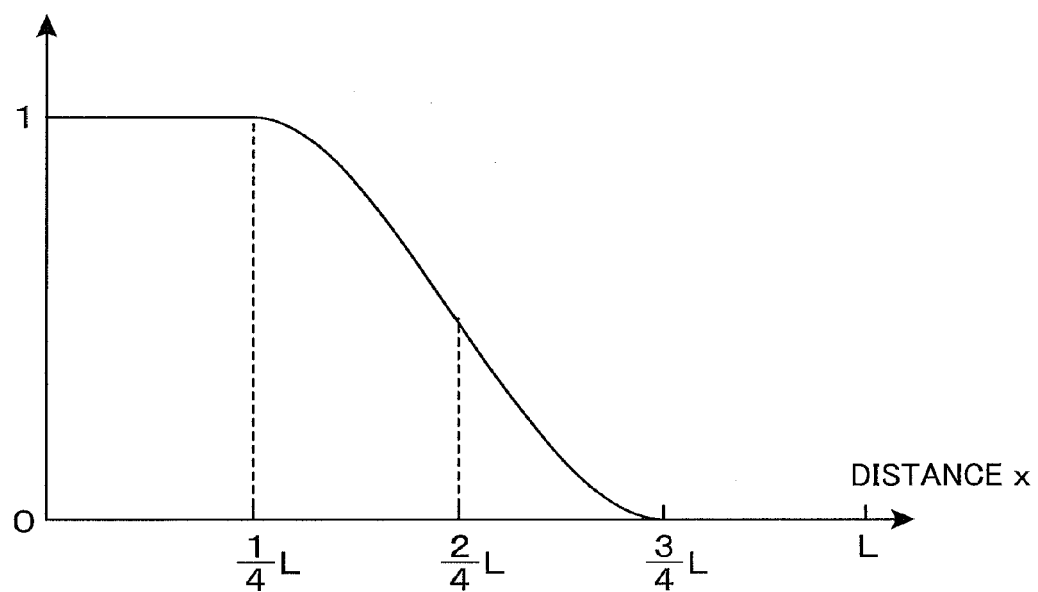
FIG. 5 is a graph of a distribution factor function of a gradation pattern used to prepare the hologram recording medium shown in FIG. 2.

Of the basic processes carried out in the "attribute assigning step" of step S30, first, a gradation pattern, which expresses that an appearance probability of a first record attribute and an appearance probability of a second record attribute change gradually in space, is defined. This shall now be described in line with a specific example. FIG. 5 is a graph of a distribution factor function of a gradation pattern that is used to prepare the hologram recording medium shown in FIG. 2. The abscissa of the graph indicates a distance x and the ordinate indicates a distribution factor $f(x)$. Here, the distribution factor $f(x)$ is a function of x that takes on values in a range of $0 \le f(x) \le 1$, and in the present example, $f(x)=1$ in a distance range of $x \le L/4$, $f(x)=0$ in a distance range of $x \ge 3L/4$, and $f(x)$ is a function that gradually decreases monotonously with x in a distance range of $L/4 \le x < 3L/4$. L is the transverse width of the recording medium as shown in FIG. 2, and at the position of $x=2L/4$ (central position in the left/right direction in FIG. 2), $f(x)=0.5$.

Figure 6:
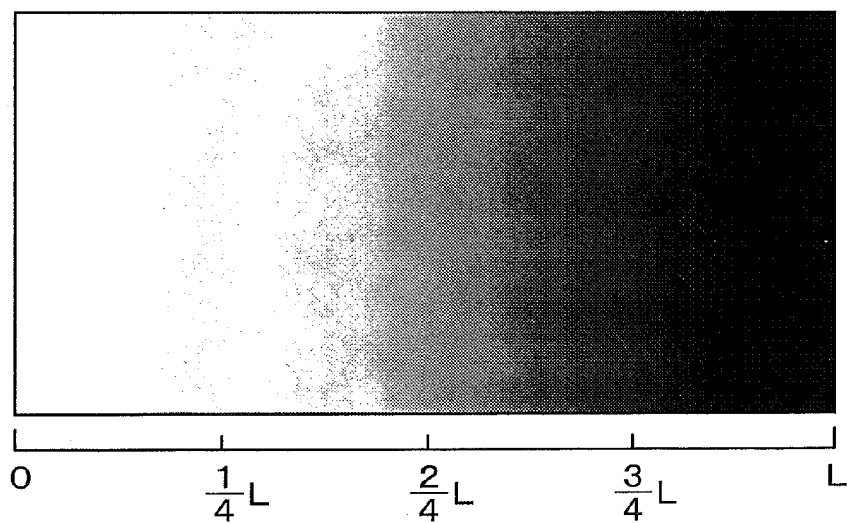
FIG. 6 is a plan view showing the gradation pattern, defined by the distribution factor function f(x) shown in FIG. 5, as a gray density pattern.

FIG. 6 is a plan view showing the gradation pattern, defined by the distribution factor function f(x) shown in FIG. 5, as a gray density pattern. That is, f(x)=1 is expressed by white, f(x)=0 is expressed by black, and intermediate values between 1 and 0 are expressed by gray of predetermined densities. The recording medium shown in FIG. 2 corresponds to overlappingly recording the first original image Pic(A), shown in FIG. 4A, and the second original image Pic(B), shown in FIG. 4B, according to the gradation pattern density information shown in FIG. 6. That is, the recording medium shown in FIG. 2 corresponds to blendingly recording the two original images in a manner such that the stronger the white color in the gradation pattern, the higher the weight of the first original image Pic(A), and the stronger the black color in the gradation pattern, the higher the weight of the second original image Pic(B).

As mentioned above, with general images (images that are not recorded as interference fringe patterns or diffraction grating patterns), the blending of two original images according to a gradation pattern, such as shown in FIG. 6, can be performed by the known process called "α-blending." That is, if the distribution factor f(x), shown in the graph of FIG. 5, is used as it is as the α value, a pixel value Pc of a pixel at a predetermined position of an image C obtained by blending an image A and an image B is determined by the formula: "Pc=f(x)·Pa+(1−f(x))·Pb," based on a pixel value Pa of the image A and a pixel value Pb of the image B at the corresponding position.

However, as mentioned above, in the case of a hologram recording medium, the α-blending method for such general images cannot be applied as it is. Thus, with the present invention, blending according to the gradation pattern is realized based on the following basic concept.

That is, firstly, in a single unit region, just one of either information concerning the first original image Pic(A) or information concerning the second original image Pic(B) is recorded selectively. Although in the case of α-blending of general images, processing is performed with the idea of blending the pixel values of the two images to be blended, in the present invention, a method of blending pixel values is not employed and only information concerning one of either of the original images is recorded in a single unit region. In a hologram recording medium, information on original images are recorded as interference fringe patterns or diffraction grating patterns, and by recording an interference fringe pattern or a diffraction grating pattern concerning just one of the original images in a single unit region, the diffraction phenomenon can be made to occur efficiently and a clear reproduction image can be obtained.

Secondly, the gradation pattern information is reflected in the selection between recording information concerning the first original image Pic(A) and recording information concerning the second original image Pic(B) in each individual unit region. For example, if selection between the first original image Pic(A) and the second original image Pic(B) is to be performed using the gradation pattern shown in FIG. 6, a process of overlapping the gradation pattern of FIG. 6 onto the recording surface Rec, on which the array of the respective unit regions U, shown in FIG. 4C, has been defined, and selecting one of the two original images according to the density of the gradation pattern on each unit region U is performed.

Because the gradation pattern of FIG. 6 corresponds to the distribution factor function f(x) of FIG. 5, by overlapping this gradation pattern onto the recording surface Rec, a predetermined distribution factor f(x) can be defined for each individual unit region U. For example, by defining a positional reference point for each unit region (specifically, for example, a central point of each unit region may be defined as the positional reference point), the predetermined distribution factor f(x) can be defined based on the x-coordinate value of this positional reference point. A process of selecting one of the original images in a manner such that the first original image Pic(A) is selected at a probability of the distribution factor f(x) and the second original image Pic(B) is selected at a probability of 1−f(x) is then performed.

With the present invention, "selection of a specific original image to be recorded in a specific unit region" is expressed as "assigning a record attribute of a specific original image to a specific unit region." With the above example, a first record attribute "A" is assigned to a unit region, for which the first original image Pic(A) has been selected as the original image to be recorded, and a second record attribute "B" is assigned to a unit region, for which the second original image Pic(B) has been selected as the original image to be recorded.

Figures 7, 8:
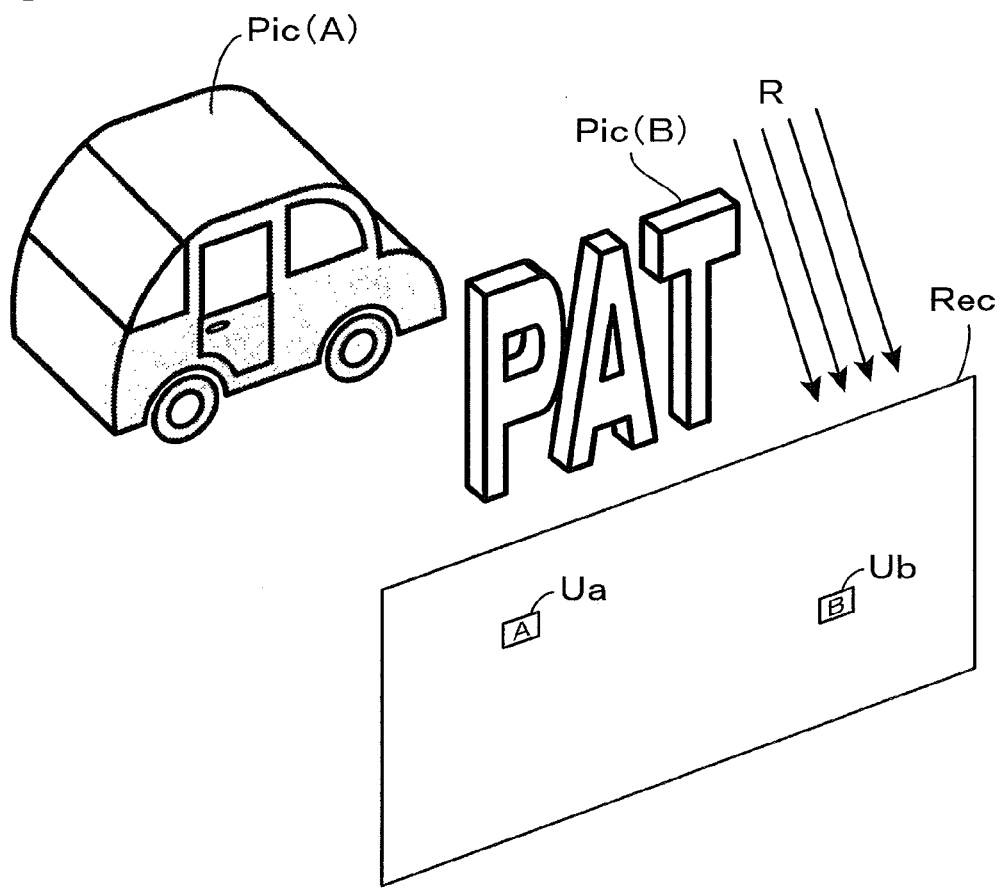
FIG. 7 is a plan view of record attributes assigned to the respective unit regions by overlapping the gradation pattern, shown in FIG. 6, onto the recording surface, shown in FIG. 4C.
FIG. 8 is a perspective view of principles of recording interference fringe patterns by positioning the two original images, shown in FIGS. 4A and 4B, and the recording surface, shown in FIG. 4C, in a three-dimensional space.

FIG. 7 is a plan view of the record attributes assigned to the respective unit regions by overlapping the gradation pattern, shown in FIG. 6, onto the recording surface, shown in FIG. 4C. Each individual cell of square shape, shown in FIG. 7, corresponds to an individual unit region U, shown in FIG. 4C, and the character "A" or "B" that is indicated in each cell indicates the record attribute assigned to the corresponding unit region. Because with the distribution factor function f(x), shown in FIG. 5, f(x)=1 in the range of 0≤x≤L/4, the record attribute "A" is assigned at a probability of 100% to the unit regions (of column numbers 1 to 4) positioned in the range of 0≤x≤L/4 in FIG. 7. Likewise, because with the distribution factor function f(x), shown in FIG. 5, f(x)=0 in the range of 3L/4≤x≤L, the record attribute "B" is assigned at a probability of 100% to the unit regions (of column numbers 13 to 16) positioned in the range of 3L/4≤x≤L in FIG. 7. In the intermediate range of L/4≤x≤3L/4 (column numbers 5 to 12), the appearance probability of the record attribute "A" becomes higher toward the left side and the appearance probability of the record attribute "B" becomes higher toward the right side.

The distribution factor function f(x), shown in FIG. 5, and the gradation pattern, shown in FIG. 6, thus indicate the appearance probability of each record attribute at each individual position. Because in the example illustrated here, just one of either the record attribute "A" or the record attribute "B" is always assigned to each unit region, the assigning of the record attribute "B" is a complementary event with respect to the assigning of the record attribute "A." The sum of the appearance probability of the record attribute "A" and the appearance probability of the record attribute "B" is thus always 1. Put in another way, although the distribution factor function f(x) in itself expresses the appearance probability of the record attribute "A," it also indirectly expresses the appearance probability of the record attribute "B" in the form of "1−f(x)."

Thus, in the "attribute assigning step" of step S30 of FIG. 3, a process, of defining a gradation pattern, which expresses that the appearance probability of the first record attribute "A" and the appearance probability of the second record attribute "B" gradually change in space, and assigning one of either the first record attribute "A" or the second record attribute "B" to each unit region according to the "appearance probability of each record attribute" at each individual position when the gradation pattern is overlapped onto the recording surface Rec, is performed.

Although in the embodiment described here, one of either the first record attribute "A" or the second record attribute "B" is always assigned to each unit region and it is deemed that there are no unit regions to which a record attribute is not assigned, unit regions, to which neither record attribute is assigned, may be set up in some cases. That is, in the embodiment described here, the appearance probability of the record attribute "A" is defined by the distribution factor function f(x) and the appearance probability of the record attribute "B" is also indirectly defined in the form of "1−f(x)." Although this definition is premised on the assigning of the record attribute "B" being a complementary event of the assigning of the record attribute "A," a setting in which the appearance probability of the record attribute "B" is made less than "1−f(x)" is also possible. With such a setting, the sum of the appearance probability of the record attribute "A" and the appearance probability of the record attribute "B" is not 1.

For example, by defining the appearance probability of the record attribute "A" by a distribution factor function fa(x), defining the appearance probability of the record attribute "B" by a distribution factor function fb(x), and setting these functions so that fa(x)+fb(x)<1, unit regions, to which neither record attribute is assigned, will appear (with the appearance probability being 1−fa(x)−fb(x)). In putting the present invention into practice, such unit regions, to which neither record attribute is assigned, may be present.

When the process of assigning attributes to the respective unit region is thus completed, the "record pattern preparing step" of step S40, shown in the flowchart of FIG. 3, is executed. In this step, a process, of determining an interference fringe pattern or diffraction grating pattern, based on the first original image Pic(A), for each unit region to which the first record attribute "A" was assigned, determining an interference fringe pattern or diffraction grating pattern, based on the second original image Pic(B), for each unit region to which the second record attribute "B" was assigned, and finally preparing data indicating a predetermined record pattern to be formed on the recording surface Rec, is executed.

FIG. 8 is a perspective view of principles of recording interference fringe patterns onto the recording surface Rec by positioning the two original images Pic(A) and Pic(B), shown in FIGS. 4A and 4B, and the recording surface Rec, shown in FIG. 4C, in a three-dimensional space. Because this process is actually executed as a simulation computation of optical phenomena on a computer, the original images Pic(A) and Pic(b) and the recording surface Rec are virtual objects positioned in a three-dimensional space on a computer.

Specifically, as shown in the figure, a predetermined reference light R is set in addition to the original images Pic(A) and Pic(B) and the recording surface Rec, and interference fringe patterns formed at respective portions of the recording surface Rec by object light emitted from the original images Pic(A) and Pic(B) and the reference light R are determined by computation by the computer. Although in the illustrated example, the reference light R is set in common for the original images Pic(A) and Pic(B), a reference light Ra for recording the original images Pic(A) and a reference light Rb for recording the original images Pic(B) may instead be set separately. Because such an interference fringe pattern computing method is a general method for computer holograms as disclosed, for example, in the abovementioned Patent Documents 1 to 3, detailed description of the computing method itself shall be omitted.

An important characteristic of the "record pattern preparing step" of step S40 of the present invention is that the original image to be recorded differs according to each individual unit region defined on the recording surface Rec. On the recording surface Rec shown in FIG. 8, a plurality of unit regions are defined (the unit region defining step of step S20) as shown in FIG. 4C, and each individual unit region is assigned with a predetermined record attribute (the attribute assigning step of step S30) as shown in FIG. 7. For example, the record attribute "A" is assigned to a unit region Ua on the recording surface Rec, shown in FIG. 8, and the record attribute "B" is assigned to a unit region Ub. Here, in computing and recording the interference fringe patterns, only an interference fringe pattern based on the first original image Pic(A) is recorded in the unit region Ua, to which the record attribute. "A" is assigned, and only an interference fringe pattern based on the second original image Pic(B) is recorded in the unit region Ub, to which the record attribute "B" is assigned.

That is, an interference fringe pattern of the object light from the first original image Pic(A) and the reference light R is recorded in the unit region Ua, and in this process, the object light from the second original image Pic(B) is completely ignored. Likewise, an interference fringe pattern of the object light from the second original image Pic(B) and the reference light R is recorded in the unit region Ub, and in this process, the object light from the first original image Pic(A) is completely ignored. Because in a computer hologram method, the interference fringe patterns are determined by computation, such a process of determining an interference fringe pattern upon selecting the object light can be carried out freely by a program.

A predetermined record pattern is thus prepared on the recording surface Rec by the "record pattern preparing step" of step S40, and the object to be recorded according to the record pattern differs according to each individual unit region. That is, with the respective unit regions shown in FIG. 7, interference fringe patterns concerning the first original image Pic(A) are recorded in the unit regions to which the record attribute "A" is assigned, and interference fringe patterns concerning the second original image Pic(B) are recorded in the unit regions to which the record attribute "B" is assigned.

Because only an interference fringe pattern concerning a single original image is recorded in a single unit region, diffracted light that enables formation of a clear reproduction image is obtained from each unit region during observation. Also, because, on the recording surface Rec, the appearance probability of a unit region to which record attribute "A" has been assigned and the appearance probability of a unit region to which record attribute "B" has been assigned is in accordance with the gradation pattern shown in FIG. 6, when the recording surface Rec is observed as a whole, a motif according to the original image Pic(A) and a motif according to the original image Pic(B) are respectively expressed in gradated states and the effect of blending of the boundary portions of the two motifs is obtained as show in FIG. 2.

The mode of observation of the two motifs that are reproduced by the hologram recording medium prepared by the preparing method according to the present invention differs from the mode of observation of two motifs in a conventional, multi image hologram recording medium. That is, whereas with the conventional multi image hologram recording medium, the first motif is observed or the second motif is observed by change of the observation direction, with the hologram recording medium according to the present invention, a mode, in which a change from the first motif to the second motif occurs in space, is observed regardless of the observation direction.

If in the "attribute assigning step" of step S30, a setting is made such that unit regions, to which neither record attribute is assigned, are present, neither of the interference fringe patterns of the two images is recorded in these unit regions. That is, diffracted light for reproduction is not obtained from these unit regions during reproduction. Although such unit regions, to which neither record attribute is assigned, thus do not directly contribute to the object of displaying a reproduction image of the original images, by setting up such unit regions at portions, a contribution can be made to the object of displaying a reproduction image that is gradated as a whole.

Although in the above description, an example of recording two types of original images Pic(A) and Pic(B) next to each other was described, the present invention can obviously be used in cases of recording three or more types of original images next to each other as well. For example, in a case of recording three types of original images Pic(A), Pic(B), and Pic(C) next to each other, a gradation pattern is defined in regard to the respective original images and record attributes "A," "B," and "C" are assigned to the respective individual unit regions according to the appearance probabilities indicated by the gradation pattern. By employing such a method, a hologram recording medium, with which, for example, the motif of the original image Pic(A) gradually changes to the motif of the original image Pic(B) and furthermore changes to the motif of the original image Pic(C) from the left to the right, can be prepared.

In the "medium forming step" of the last step S50 of FIG. 3, a process, of forming a record pattern on a physical medium based on the record pattern data on the recording surface Rec prepared in step S40, is performed. Although as mentioned above, the procedures up to step S40 are processes that are carried out on a computer, the procedure of step S50 is a processing procedure of using the record pattern data, prepared by processing on the computer, to form interference fringe patterns or diffraction grating patterns on an actual, physical medium. Specifically, a process of transmitting the prepared record pattern data to an electron beam drawing equipment, etc., and preparing the physical medium is performed. Because specific methods for forming such a physical hologram recording medium are known arts, detailed description thereof shall be omitted here.

<<<Section 2. Processing in the Attribute Assigning Step>>>

The "attribute assigning step" of step S30 of FIG. 3 shall now be described in more detail. As mentioned above, in this attribute assigning step, a process, of defining a gradation pattern, which expresses that the appearance probability of the first record attribute "A" and the appearance probability of the second record attribute "B" change gradually in space, and assigning, to each unit region, one of either the first record attribute "A" or the second record attribute "B" or neither record attribute (in a case where unit regions in which neither pattern is to be recorded are set up) according to the appearance probabilities of the respective record attributes at each individual position when the gradation pattern is overlapped onto the recording surface Rec, is performed.

Step S30 in FIG. 3 is constituted of the procedures of the three steps of the "reference setting step" of S31, the "distribution factor setting step" of step S32, and the "attribute determining step" of step S33, and the significances of the procedures of these three steps shall now be described.

Figure 9:
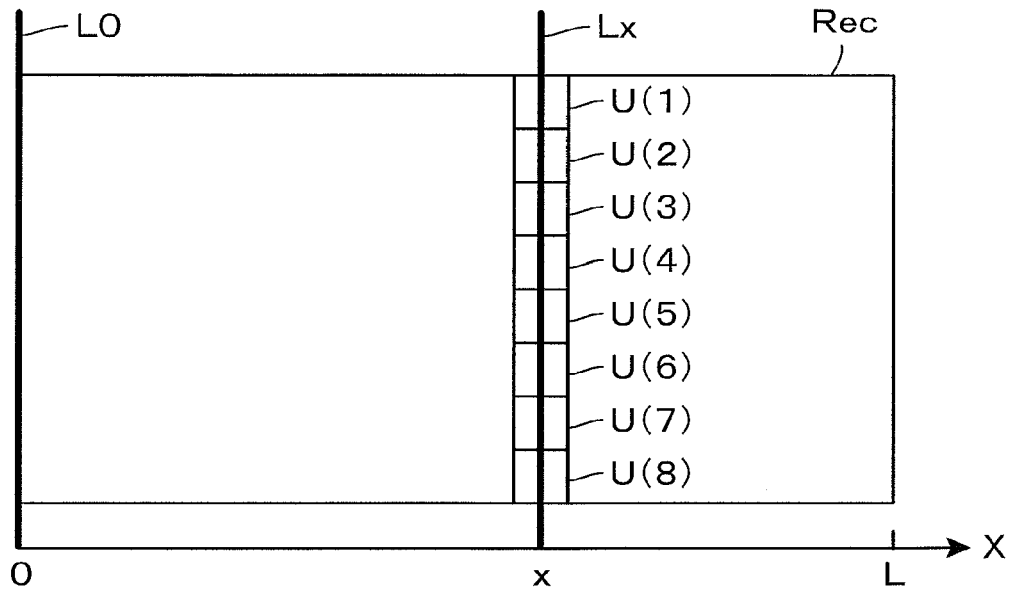
FIG. 9 is a plan view of an example of assigning record attributes to unit regions positioned on a specific positioning line Lx on the recording surface Rec.

FIG. 9 is a plan view of an example of a method for assigning predetermined record attributes respectively to unit regions U(1) to U(8) positioned on a specific positioning line Lx on the recording surface Rec. The recording surface Rec is a rectangular region, and a distance reference line L0 is defined on the left edge thereof. This distance reference line L0 is a line that passes through the origin of a coordinate axis X set in a horizontal direction of the figure, and a coordinate value x along this coordinate axis X indicates the distance from the distance reference line L0. For example, a point on the distance reference line L0 is a point at the distance x=0, and a point on the right edge of the recording surface Rec is a point at the distance x=L (L being the transverse width of the recording surface Rec).

Here, a case where a plurality of unit regions U are defined on the recording surface Rec as shown in FIG. 4C and predetermined record attributes are to be assigned to the respective individual unit regions shall be considered. Specifically, one of either the first record attribute "A" or the second record attribute "B" is to be assigned to each unit region according to the appearance probabilities of the respective record attributes at each individual position when the gradation pattern, shown in FIG. 6, is overlapped onto the recording surface Rec. Here, if the position of each individual unit region is expressed by the x-coordinate value based on the central point of the unit region, the positions of the illustrated unit regions U(1) to U(8) can be expressed by the x-coordinate value of the positioning line Lx that passes through the centers of these unit regions. Because the gradation pattern shown in FIG. 6 corresponds to the distribution factor function f(x), shown in FIG. 5, the appearance probability of the first record attribute "A" at the position of the positioning line Lx of FIG. 9 is expressed by the distribution factor f(x). Here, the distribution factor f(x) is a function of the distance x and takes on values in a range of $0 \le f(x) \le 1$.

The attributes assigned to the respective unit regions U(1) to U(8) are thus determined so that, in accordance with the distribution factor f(x), the first record attribute "A" is assigned at a proportion of f(x) and the second record attribute "B" is assigned at a proportion of 1−f(x). When f(x)=1, the first record attribute "A" is assigned to all unit regions U(1) to U(8) on the positioning line Lx, and when f(x)=0, the second record attribute "B" is assigned to all unit regions U(1) to U(8) on the positioning line Lx.

Figure 10:
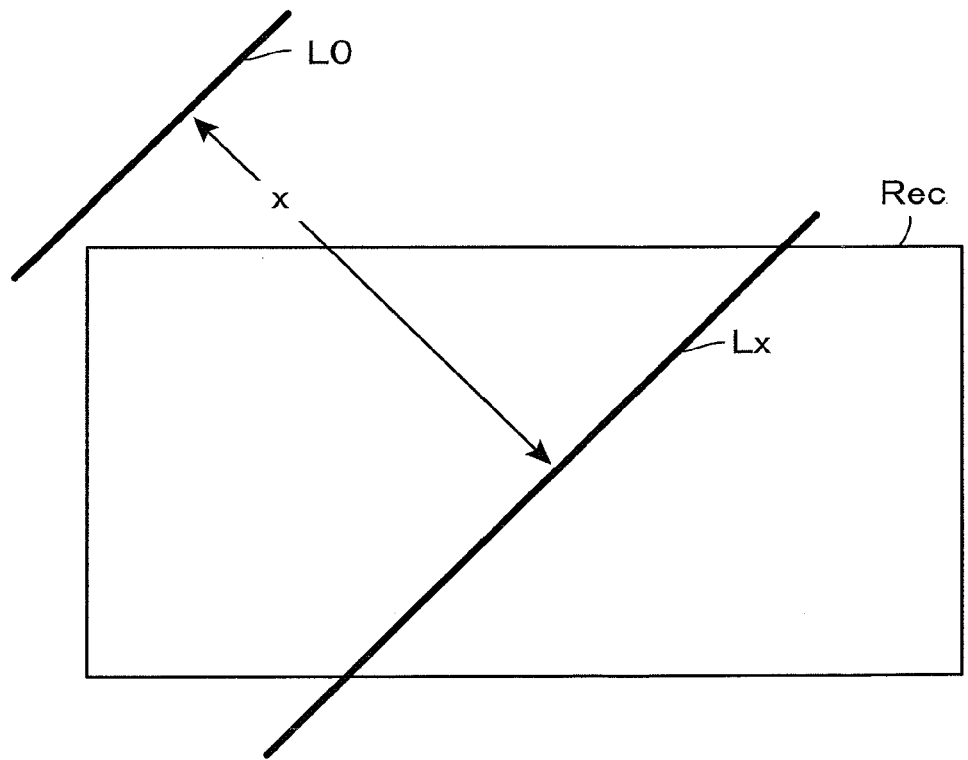
FIG. 10 is a plan view showing another method for defining the positioning line Lx on the recording surface Rec.

Although in FIG. 9, the distance reference line L0 is defined on a left edge of the rectangle constituting the recording surface Rec, the distance reference line L0 may be defined in any direction at any position. For example, FIG. 10 is a plan view showing another example of a method for defining the positioning line Lx on the recording surface Rec. In the example of FIG. 10, the distance reference line L0 is defined outside the recording surface Rec. The distance reference line L0 may thus be defined at any position and in any direction as long as it is on the plane that contains the recording surface Rec.

Thus, with the embodiments shown in FIGS. 9 and 10, the "reference setting step" of step 31 that constitutes the step S30 of FIG. 3 is a step of defining the distance reference line L0 on the plane containing the recording surface Rec, the "distribution factor setting step" of step S32 is a step of defining the distribution factor f(x), which, as a function of the distance x, takes on values in the range of $0 \le f(x) \le 1$, and the "attribute determining step" of step S33 is a step of determining the record attribute to be assigned to each unit region in a manner such that, to the unit regions, positioned on the positioning line Lx, which is parallel to and separated from the distance reference line L0 by just the distance x, the first record attribute "A" is assigned at a proportion of f(x) and the second record attribute "B" is assigned at a proportion of "1−f(x)."

Because each individual unit region is a region having an area, the "distance from the distance reference line L0" does not necessarily have to be defined strictly. For example, although with the example shown in FIG. 9, the distance between the unit regions U(1) to U(8) and the distance reference line L0 is defined by the position x of the positioning line Lx that passes through the central points of these unit regions, the positioning line Lx may instead be defined on left edges, right edges, or any other position of the respective unit regions.

Also, attribute determination may be performed so that, in assigning the attributes to the total of 16 unit regions positioned in the 8th and 9th columns in FIG. 7, the x-coordinate value (x=2L/4) of a positioning line Lx, at a boundary line position between the 8th and 9th columns, is used to assign the first record attribute "A" at a proportion of f(x) and assign the second record attribute "B" at a proportion of "1−f(x)." In this case, attribute assignment is performed using the coordinate value x of x=2L/4 in common for the 16 unit regions that positioned near the positioning line Lx, which is parallel to and separated by just the distance x=2L/4 from the distance reference line L0.

Thus, in the "attribute determining step" of step S33, attribute determination, such that the first record attribute "A" is assigned at a proportion of f(x) and the second record attribute "B" is assigned at a proportion of "1−f(x)," may be performed not only on unit regions positioned on the positioning line Lx, which is parallel to and separated by just the distance x from the distance reference line L0, but also on unit regions positioned near the positioning line Lx.

It is also possible, as described above, to assign neither of the first record attribute "A" and the second record attribute "B" to some of the unit regions and make these regions those in which no pattern is formed in the final stage. In this case, the proportion by which the second record attribute "B" is assigned is set not to the proportion of "1−f(x)" but to a predetermined proportion less than "1−f(x)." For example, whereas normally when f(x)=0.7, one of either record attributes is assigned by assigning the first record attribute "A" to 70% of the unit regions of the entirety and assigning the second record attribute "B" to 30% (1−0.7=0.3) of the unit regions of the entirety, if the second record attribute "B" is assigned to less than 30% of the entirety (for example, to 20% of the unit regions of the entirety), a portion of the unit regions (10% of the unit regions of the entirety in the case of the above example) is left without being assigned with either record attribute.

Thus, by setting the proportion at which the second record attribute "B" is assigned not to the proportion of "1−f(x)" but to the predetermined proportion less than "1−f(x)," unit regions, to which neither record attribute is assigned, arise. Although such unit regions, to which neither record attribute is assigned, do not directly contribute to the object of displaying a reproduction image of the original images, by setting up such unit regions at portions, a contribution can be made to the object of displaying a reproduction image that is gradated as a whole as described above.

Although the distribution factor function f(x), defined in the "distribution factor setting step" of step S32 may be any function, for practical purposes, the use of a monotonously decreasing function, such as shown in the graph of FIG. 5, or oppositely a monotonously increasing function is preferable. By using a monotonously decreasing function or a monotonously increasing function as the distribution factor function f(x), a "gradation pattern with unidirectionality in the density change," such as shown in FIG. 6, can be defined to enable a natural expression such that a first motif changes gradually to a second motif from the left to the right as in the example shown in FIG. 2.

In the "attribute determining step" of step S33, a process of assigning the first record attribute "A" and the second record attribute "B" at predetermined proportions to the plurality of unit regions positioned on the positioning line Lx is performed, and some specific methods for assigning specific record attributes at such predetermined proportions shall now be described.

In a simplest method for assigning one of either record attributes to each unit region, random numbers are used to assign the first record attribute "A" to N×f(x) unit regions among a plurality N of unit regions positioned on the same positioning line and assign the second record attribute "B" to the remaining unit regions. Consider, for example, a case in which, for the total of 16 unit regions positioned in the 8th column and 9th column of FIG. 7, the first record attribute "A" is to be assigned at a proportion of the distribution factor f(x)=0.5 and the second record attribute "B" is to be assigned to the remaining unit regions. In this case, for each individual unit region, a random number between 0 and 1 is generated, the first record attribute "A" is assigned when a random number value of no more than 0.5 is obtained, and the second record attribute "B" is assigned when a random number value exceeding 0.5 is obtained. By doing so, the first record attribute "A" is stochastically assigned to 8 unit regions of the total of 16 unit regions and the second record attribute "B" is assigned to the remaining 8 unit regions.

As another method for assigning record attributes, an integer ratio α:β that approximates "f(x)":"1−f(x)" is determined for each individual positioning line, and for (α+β) successive unit regions among the plurality of unit regions positioned on a single positioning line, the first record attribute "A" is assigned to α unit regions and the second record attribute "B" is assigned to β unit regions. For example, if f(x)=0.24, the integer ratio, 1:3, can be determined as the integer ratio α:β that approximates "f(x)":"1−f(x)." Thus, in this case, the first record attribute "A" is assigned to 1 unit region and the second record attribute "B" is assigned to 3 unit regions of 4 successive unit regions among the 8 unit regions U(1) to U(8) positioned on the single positioning line Lx shown in FIG. 9. Here, the first record attribute "A" is assigned to the unit region U(1), the second record attribute "B" is assigned to the unit regions U(2) to U(4), the first record attribute "A" is assigned to the unit region U(5), and the second record attribute "B" is assigned to the unit regions U(6) to U(8).

Although with the embodiments described up until now, examples of using a gradation pattern, with which a density change appears in the horizontal direction as shown in FIG. 6, were described, various gradation patterns can be used to assign record attributes with the method according to the present invention. Some variations of gradation patterns shall now be described.

Figure 11:
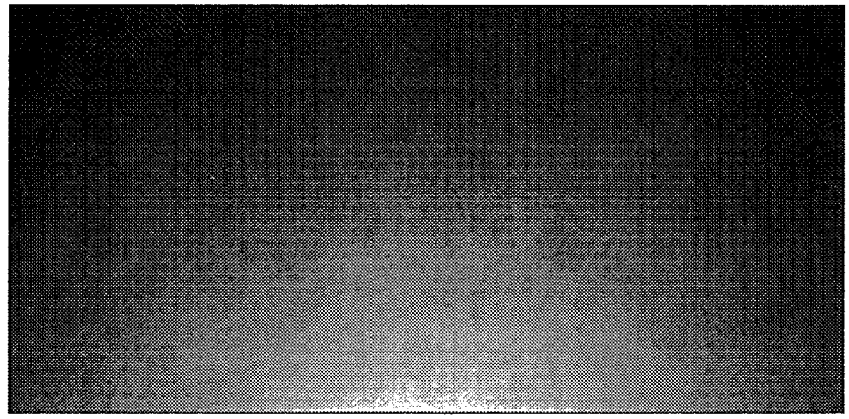
FIG. 11 is a plan view showing an example of a spherically changing gradation pattern as a gray density pattern.
Figure 12:
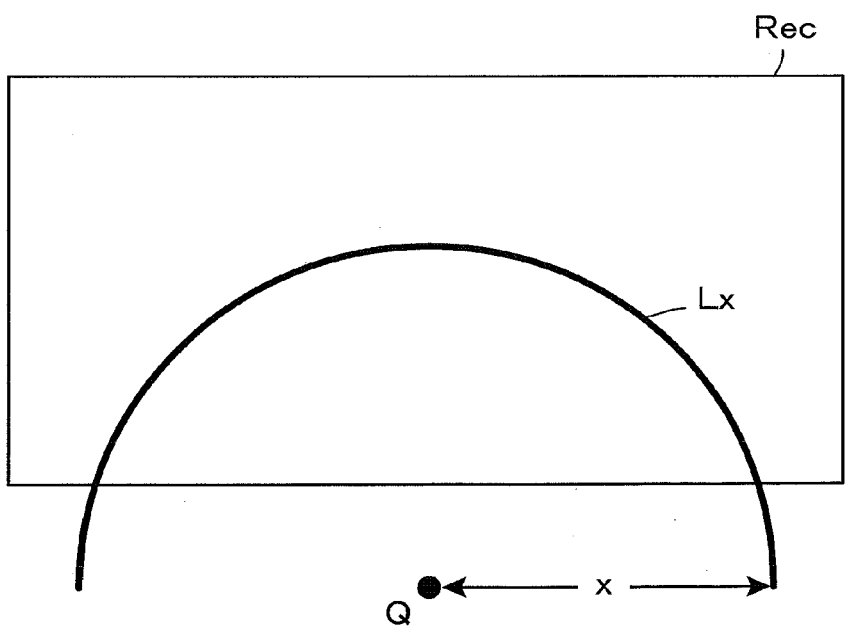
FIG. 12 is a plan view of a method for defining a positioning line Lx along a circumference by overlapping the gradation pattern shown in FIG. 11 onto the recording surface Rec.

FIG. 11 is a plan view showing an example of a spherically changing gradation pattern as a gray density pattern. In this example, a gray gradation pattern, with which the density of black increases with increase of a distance x from a distance reference point Q, set outside the pattern, is shown. FIG. 12 is a plan view of a method for defining a positioning line Lx along a circumference by overlapping the gradation pattern shown in FIG. 11 onto the recording surface Rec. Whereas with the example shown in FIG. 9, the positioning line Lx is a straight line, with the example shown in FIG. 12, an arcuate positioning line Lx is defined, and predetermined record attributes are assigned in proportions according to the distribution factor f(x) to unit regions positioned on or near the arcuate positioning line Lx.

In using such a gradation pattern, a process of defining the distance reference point Q on the plane containing the recording surface Rec is performed in the "reference setting step" of step S31, the distribution factor f(x), which takes on values in the range of 0≤f(x)≤1, is defined as a function of the distance x in the "distribution factor setting step" of step S32, and, in the "attribute determining step" of step S33, the record attributes to be assigned to the respective unit regions are determined so that the first record attribute "A" is assigned at a proportion of f(x) and the second record attribute "B" is assigned at a proportion of "1−f(x)" or less to the unit regions positioned on or near the positioning line Lx, defined as the circumference of the circle of a radius x centered about the distance reference point Q.

When a gradation pattern such as that shown in FIG. 11 is used to perform recording concerning two original images, a hologram recording medium, with which the first motif gradually changes to the second motif in a spherical manner centered about the distance reference point Q, is obtained.

Figure 13:
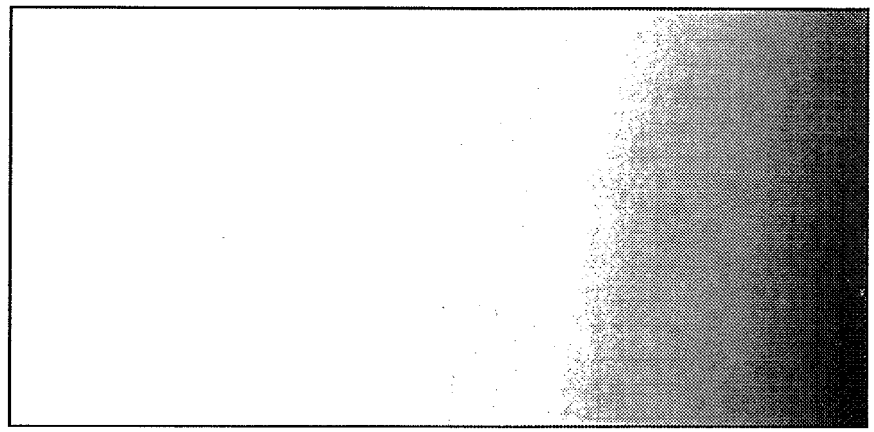
FIG. 13 is a plan view showing an example of a gradation pattern, which changes in a rotation direction, as a gray density pattern.
Figure 14:
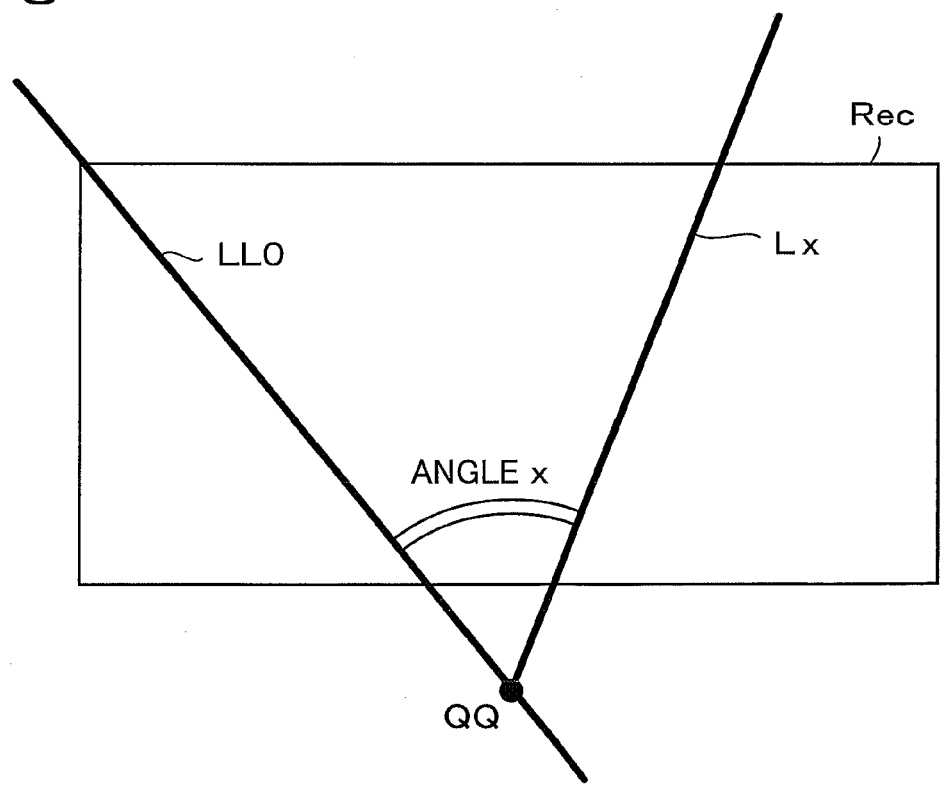
FIG. 14 is a plan view of a method for defining a positioning line Lx along a radius by overlapping the gradation pattern shown in FIG. 13 onto the recording surface Rec.

Meanwhile, FIG. 13 is a plan view showing an example of a gradation pattern, which changes in a rotation direction, as a gray density pattern. In this example, a gray gradation pattern, with which the density of black increases with increase of a clockwise rotation angle x centered about an angle reference point QQ, set outside the pattern, is shown. FIG. 14 is a plan view of a method for defining a positioning line Lx along a radius by overlapping the gradation pattern shown in FIG. 13 onto the recording surface Rec. Although as with the example shown in FIG. 9, the positioning line Lx itself is a straight line in the example shown in FIG. 14, the positioning line Lx is defined as a straight line passing through the angle reference point QQ and the separation from an angle reference line LL0 that passes through the angle reference point QQ is defined not as a distance but as an angle value x. Predetermined record attributes are assigned in proportions according to the distribution factor f(x) to unit regions positioned on or near the positioning line Lx in this example as well.

In using such a gradation pattern, a process of defining the angle reference point QQ on the plane containing the recording surface Rec and defining the angle reference line LL0 that passes through the angle reference point QQ is performed in the "reference setting step" of step S31, the distribution factor f(x), which takes on values in the range of $0 \leq f(x) \leq 1$, is defined as a function of the angle x in the "distribution factor setting step" of step S32, and, in the "attribute determining step" of step S33, the record attributes to be assigned to the respective unit regions are determined so that the first record attribute "A" is assigned at a proportion of f(x) and the second record attribute "B" is assigned at a proportion of "1−f(x)" or less to the unit regions positioned on or near the positioning line Lx that passes through the angle reference point QQ and is inclined by just the angle x with respect to the angle reference line LL0.

When a gradation pattern such as that shown in FIG. 13 is used to perform recording concerning two original images, a hologram recording medium, with which the first motif gradually changes to the second motif in a fan-like manner with respect to the angle reference line LL0, is obtained.

Figures 15, 16:
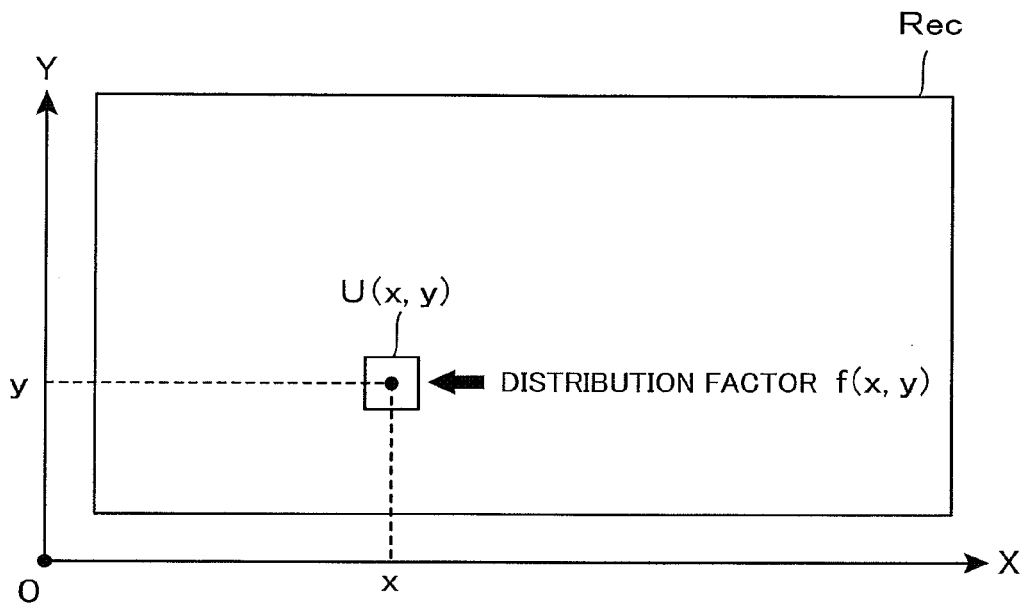
FIG. 15 is a plan view of an example of defining a gradation pattern on the recording surface Rec using a distribution factor f(x, y) expressed by a two-dimensional function.
FIG. 16 is a plan view of an example of a table constituted of a two-dimensional array for defining distribution factors f.

Though in all of the examples described up until now, a one-dimensional distribution factor function f(x) is defined, the distribution factor function does not necessarily have to be a one-dimensional function, and a two-dimensional distribution factor function may be defined and used instead. FIG. 15 is a plan view of an example of defining a gradation pattern on the recording surface Rec using a distribution factor f(x, expressed by a two-dimensional function. As illustrated, a two-dimensional XY coordinate system, having an origin O is defined on the plane containing the recording surface Rec to enable the position (for example, a central point or other predetermined reference point position) of any unit region U(x, on the recording surface Rec to be expressed by coordinate values (x, y). Meanwhile, a two-dimensional distribution factor function f(x, y) is defined to enable association of a predetermined distribution factor with each position of coordinates (x, y) on the recording surface Rec. A predetermined distribution factor f(x, y) can thereby be associated with an arbitrary unit region U(x, y), and the record attribute to be assigned to the unit region U(x, y) can be determined based on the distribution factor f(x, y).

In employing such a method for defining a gradation pattern by a two-dimensional distribution factor function f(x, y), the following processes are performed in the respective steps. First, in the "reference setting step" of step S31, the two-dimensional XY coordinate system is defined on the plane containing the recording surface Rec. Although the origin O and the coordinate axes X and Y do not necessarily have to be defined on the recording surface Rec, for practical purposes, the setting of the origin O at one corner of the rectangular recording surface Rec, the setting of the X-axis at a lower edge of the recording surface Rec, and the setting of the Y-axis at the left edge of the recording surface Rec is convenient in terms of performing coordinate computations. In the "distribution factor setting step" of step S32 that follows, the distribution factor f(x, y), which takes on values in a range of $0 \leq f(x, y) \leq 1$, is defined as a function of the two variables x and y of the two-dimensional XY coordinate system. That is, the gradation pattern is defined by the two-dimensional distribution factor function f(x, y). Then, in the "attribute determining step" of step S33, the position coordinates (x, y) are determined for the respective unit regions and the record attributes to be assigned to the respective unit regions are determined so that the first record attribute "A" is assigned at a proportion of f(x, y) and the second record attribute "B" is assigned at a proportion of "1−f(x, y)" or less.

Any of various functions can be defined by various formulae as the two-dimensional distribution factor function f(x, y). Gradation patterns of an extremely high degree of freedom can thus be defined in comparison to the above-described cases of using a one-dimensional distribution factor function f(x).

The distribution factors to be used for record attribute assignment do not necessarily have to be defined in the form of a function, and may be prepared in the form of a table instead. FIG. 16 is a plan view of an example of a table constituted of a two-dimensional array for defining distribution factors f. This table is constituted of a matrix of the same size as the unit region array shown in FIG. 4C, and a value of a predetermined distribution factor f is defined for each individual cell. In FIG. 16, f1 to f128 are distribution factor values defined for the respective individual cells. Put in another way, the respective individual cells of this table are in a one-to-one correspondence with the respective individual unit regions defined on the recording surface. Rec and can serve a function of providing a unique distribution factor to each individual unit region U.

In employing such a method for defining the gradation pattern using a table, the "reference setting step" of step S31 does not have to be performed. In the "distribution factor setting step" of step S32, a table (a table such as that shown in FIG. 16), which defines the distribution factor f that takes on values in a range of $0 \leq f \leq 1$ for each individual unit region, is prepared, and in the "attribute determining step" of step S33, the record attributes to be assigned to the respective unit regions are determined so that the first record attribute "A" is assigned at a proportion of f defined by the table and the second record attribute "B" is assigned at a proportion of "1-f" or less. Gradation patterns of a high degree of freedom can be defined by employing the method for defining the distribution factor by a table.

In defining a gradation pattern by using a two-dimensional distribution factor function f(x, y) or a table of distribution factors, a plurality of unit regions, having the same size and same rectangular shape and arrayed in the form of a two-dimensional matrix, are preferably defined in terms of practical use.

Lastly, two methods that are preferably used in performing the process of assigning attributes to the respective unit regions shall be described. These methods are especially effective in performing attribute assignment based on distribution factors defined using a two-dimensional function f(x, y) or a two-dimensional table.

In a first method, a dithering process, using a dither mask constituted of an array adapted to the array of unit regions, is performed in the attribute determining step to determine the record attribute of each individual unit region. In general, a dithering process is a method used for converting a continuous tone image into a binary image in the technical field of printing and is widely used to express an image with continuous tone by halftone dots. With the present invention, because the process of assigning one of either the first record attribute "A" or the second record attribute "B" to each individual unit region can be substituted by a process of converting a continuous tone image to a binary image, the attribute determining step in the present invention can be performed by a dithering process. A specific method for assigning one of either the first record attribute "A" or the second record attribute "B" to each individual unit region by a dithering process shall now be described.

Figures 17, 18:
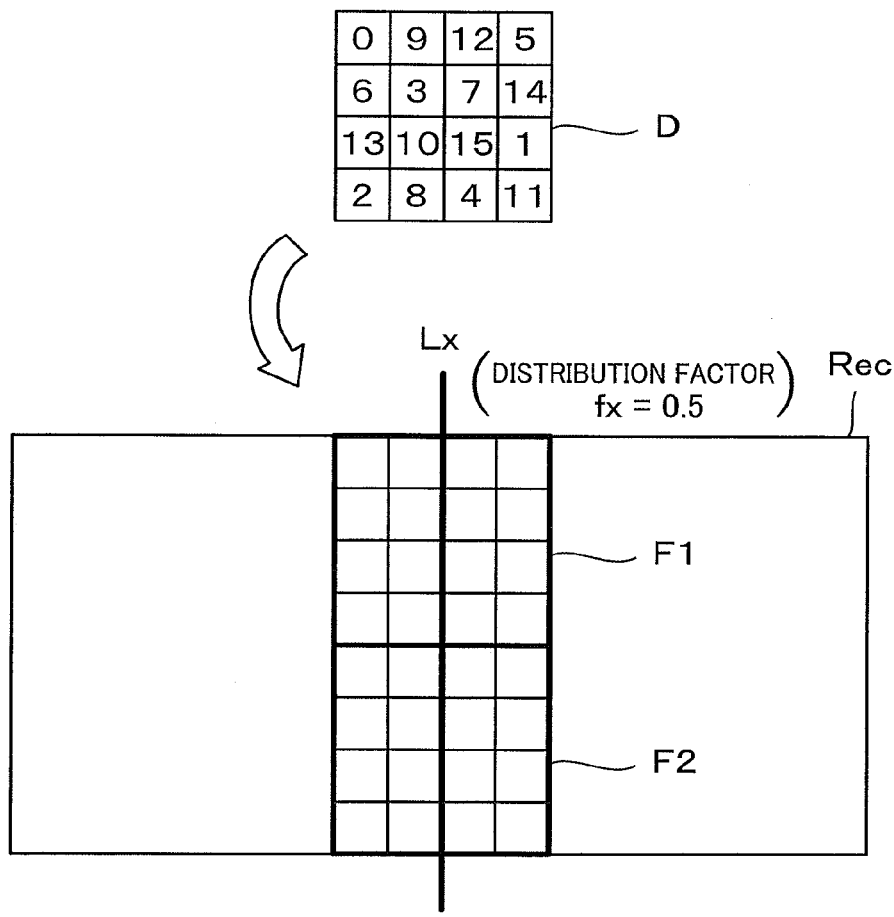
FIG. 17 is a plan view of a method for determining record attributes of respective individual unit regions by performing a dithering process using a dither mask.
FIG. 18 is a plan view of the record attributes of the respective individual unit regions determined by the method shown in FIG. 17.

FIG. 17 is a plan view of a method for determining record attributes of respective individual unit regions by performing a dithering process using a dither mask. An example of a dither mask D to be used in this dithering process is shown in an upper stage of FIG. 17. The actual entity of this dither mask D is a matrix of 4 rows and 4 columns, in which numerical values 0 to 15 are positioned at predetermined positions. Meanwhile, the recording surface Rec, on which a plurality of unit regions are defined, is shown in a lower stage of FIG. 17. Here, for the sake of description, frames F1 and F2, indicated by thick lines in the figure, are defined. Both frames F1 and F2 are arrays, in each of which unit regions are arrayed in 4 rows and 4 columns as in the dither mask, and 16 unit regions are contained in a single frame.

Here, in order to simplify the description, a positioning line Lx, such as that illustrated, shall be considered, a distribution factor fx, defined at the position of the positioning line Lx, shall be deemed to be such that fx=0.5, and a case of performing the process of assigning, based on the distribution factor fx=0.5, one of either the first record attribute "A" or the second record attribute "B" to each of the total of 32 unit regions in the frames F1 and F2 shall be considered. Here, because the appearance probability of the first record attribute "A" is 0.5 and the appearance probability of the second record attribute "B" is also 0.5, the first record attribute "A" is assigned to 16 unit regions of the total of 32 unit regions and the second record attribute "B" is assigned to the remaining 16 unit regions stochastically.

As the simplest method for assigning either of the record attributes based on such specific appearance probabilities, the method of using random numbers was described above. However, with the method of using random numbers, even though the first record attribute "A" is assigned to 16 of the 32 unit regions, the distribution of the unit regions, to which the record attribute "A" is assigned, is completely random. On the other hand, with the attribute determination method using the dithering process to be described here, the distribution of the unit regions, to which the record attribute "A" is assigned, can be controlled to some degree according to the form of distribution of the numerical values inside the dither mask D used.

With the example shown in FIG. 17, the record attributes to be assigned to the total of 32 unit regions inside the frame F1 and F2 are determined as follows. First, the dither mask D, shown in the upper stage of FIG. 17, is overlapped onto the frame F1. The record attribute "A" is then assigned to unit regions for which the numerical value inside the dither mask D is no less than 8, and the record attribute "B" is assigned to unit regions for which the numerical value inside the dither mask D is no more than 7. The dither mask D is then overlapped onto the frame F2 and the same process is performed.

FIG. 18 is a plan view of the record attributes of the respective individual unit regions that were determined for the respective unit regions inside the frames F1 and F2 by the method shown in FIG. 17. Of the 32 unit regions, the first record attribute "A" is provided to 16 unit regions, the second record attribute "B" is provided to the remaining 16 unit regions, and the distribution of the record attributes has a characteristic that is in accordance with the form of distribution of the numerical values in the dither mask D used. Thus, if unit regions having the same record attribute are to be positioned dispersedly or are oppositely to be positioned concentratingly at one location, etc., the distribution of the respective record attributes can be controlled according to the dither mask D used.

Though an example of a case where the distribution factor fx=0.5 was described above, in a case, for example, where fx=0.25, attribute determination is carried out so that the record attribute "A" is assigned with dither mask values of no less than 12 and the record attribute "B" is assigned with dither mask values of no more than 11. That is, a dither mask D, constituted of a matrix in which 0 to (N−1) successive numerical values (or 1 to N successive numerical values) appear uniformly, is overlapped onto a plurality of unit regions of the recording surface Rec, the distribution factor fx, corresponding to each individual unit region, is used to calculate N×fx, and the first record attribute "A" or the second record attribute "B" is selected based on the magnitude relationship between "this calculation result" and "the numerical value at the dither mask D position corresponding to the unit region."

A second method preferable for use in the attribute determining step is to determine the record attribute of each individual unit region using an error diffusion method. Because this error diffusion method is also widely used in converting continuous tone images into binary images, only a brief description shall be provided here.

In general, whereas the distribution factor f itself can take on any value between 0 and 1, there are only a finite number of unit regions to which attributes are to be assigned. Thus, when, for example, a numerical value of 0.73 is provided as the value of the distribution factor f for a portion of the recording surface Rec, and record attributes are to be assigned based on this distribution factor to a total of 100 unit regions, record attribute assignment at proportions faithful to the distribution factor can be performed by assigning the record attribute "A" to 73 unit regions and assigning the record attribute "B" to the remaining 27 unit regions.

However, if record attribute assignment based on the distribution factor f of the numerical value of 0.73 must be performed on a total of 10 unit regions, the fractional figure must inevitably be ignored. In this case, for example, a process of rounding the distribution factor f=0.73 and dropping the fractional figure of 0.03 so that f=0.7 and assigning the record attribute "A" to 7 unit regions and assigning the record attribute "B" to the remaining 3 unit regions is performed. However, accumulation of the round-off error of 0.03, which is dropped, may apply an influence that cannot be ignored as error. For example, when a numerical value of 0.74 is provided as the distribution factor f at another portion that is adjacent to the abovementioned portion and the fractional figure of 0.04 is dropped by rounding so that f=0.7, the process of assigning the record attribute "A" to 7 unit regions and assigning the record attribute "B" to the remaining 3 unit regions is performed and if the fractional figure is always dropped in this manner, errors due to the dropped fractional figure accumulate.

The error diffusion method prevents the accumulation of errors by diffusing such errors. That is, in the case of the above example, if a process of dropping the fractional figure of 0.03 of the distribution factor f=0.73 by rounding so that f=0.7 and assigning the record attribute "A" to 7 unit regions and assigning the record attribute "B" to the remaining 3 unit regions is performed on the first portion, by performing, on the second portion, adjacent the first portion, a process of adding the fractional figure 0.03 that was dropped in the first portion to the original distribution factor f=0.74 to make the distribution factor 0.77, then rounding this so that f=0.8, and assigning the record attribute "A" to 8 unit regions and the record attribute "B" to the remaining 2 unit regions, the accumulation of errors can be prevented.

<<<Section 3. Record Pattern Preparing Method>>>

The record pattern preparing step of step S40 in the flowchart of FIG. 3 shall now be described in more detail. In regard to this "record pattern preparing step" of step S40, a description with reference to FIG. 8 was provided above in Section 1. That is, with the example shown in FIG. 8, the two original images Pic(A) and Pic(B) and the recording surface Rec are positioned in the three-dimensional space, the interference fringe pattern of the object light from the first original image Pic(A) and the reference light R is recorded in the unit region Ua, to which the first record attribute "A" is assigned, and the interference fringe pattern of the object light from the second original image Pic(B) and the reference light R is recorded in the unit region Ub, to which the second record attribute "B" is assigned.

Such a process of determining interference fringe patterns on the recording surface Rec is performed by computing interference fringe intensities at respective individual positions of the recording surface Rec. In performing this interference fringe intensity computation, various measures that have been proposed up until now can be incorporated. For example, the abovementioned Patent Document 1 discloses a method for performing an interference fringe intensity computation while restricting spread angles of the object light, and such a method can be applied to the process of the "record pattern preparing step" of step S40 as well.

Figure 19:
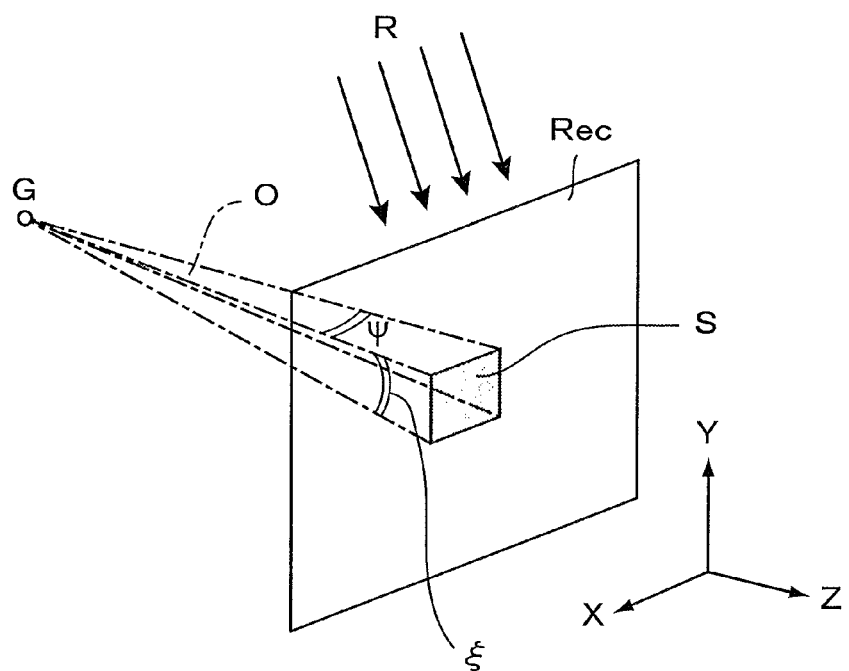
FIG. 19 is a perspective view of a method for restricting spread angles of an object light in determining an interference fringe pattern on the recording surface Rec.

FIG. 19 is a perspective view of a method for restricting spread angles of the object light in determining an interference fringe pattern on the recording surface Rec. Here, an example, in which a horizontal spread angle of the object light O from a point light source G (a single point constituting an original image) is restricted to φ and a vertical spread angle is restricted to ξ, is shown. When such restriction of spread angles is applied, the object light O from the point light source G arrives only within a restricted region S, indicated by hatching on the recording surface Rec. In other words, the information concerning the point light source G (the interference fringe pattern of the object light O and the reference light R) is recorded only inside the restricted region S on the recording surface Rec.

In comparison to such a method for forming interference fringe patterns optically, with a method for computer holograms, because interference fringe patterns can be determined by computation, hologram recording media that provide various special effects can be prepared by applying various measures in the computation process. Computation methods, to which such various measures are applied, may be used as necessary in the record pattern preparing step of step S40.

For example, as a recording medium that can display different reproduction images to an observer according to the observation direction, a stereogram, arranged by positioning a lenticular lens, a fly-eye lens, or other lens array, has been known of old. Japanese Patent Publication No. 2004-264839A and Japanese Patent Publication No. 2004-309709A disclose principles of preparing hologram recording media (CGH stereograms), with which the resolution of such stereograms can be improved significantly. With these methods, by employing a method for changing the radiance of the object light, directed from each point on a virtual object to the recording surface, according to the radiation angle, a medium providing an effect equivalent to the stereogram in the reproduction process can be prepared. Obviously, such a CGH stereogram method may also be used in the record pattern preparing step of step S40 of the present invention.

That is, with the present invention, the "original images," which are prepared in step S10 and are to be recorded in step S40, are not restricted to simply geometrical virtual objects but broadly includes subjects to be recorded by computer hologram methods. Thus, "original image" data, as referred to in the present invention, not only refers to shape data of simply geometrical virtual objects but covers various data used in the record pattern preparation computation of step S40. For example, if a method for restricting the spread angles ξ and φ, shown in FIG. 19, is to be employed in the recording process, the information concerning the restriction is also data that constitutes a portion of the "original image," and if the above-described CGH stereogram method is to be employed, the information on the radiance that changes according to radiation angle is also data that constitutes a portion of the "original image."

FIGS. 8 and 19 illustrate examples of a method for recording each original image in the form of interference fringe patterns of the object light O and the reference light R (a method for recording each image as a normal hologram). In the case where this method is employed, in determining an interference fringe pattern, based on an original image, for a unit region in the record pattern preparing step, the original image and the recording surface are positioned in the three-dimensional space, a predetermined reference light is defined, and the interference fringe pattern formed inside the unit region by the object light from the original image and the reference light is determined by computation.

Meanwhile, with the present invention, an original image can also be recorded in the form of diffraction grating patterns. As mentioned above, "hologram" in the present Application is used as a broad concept that includes not only normal holograms, formed of optical interference fringe patterns, but also includes pseudo holograms (diffraction grating recording media) formed of diffraction grating patterns. Although methods for preparing pseudo holograms, constituted of diffraction grating patterns, are known arts, such as described in the abovementioned Patent Documents 4 to 6, the principles of these methods shall be described briefly below.

Figure 20A:
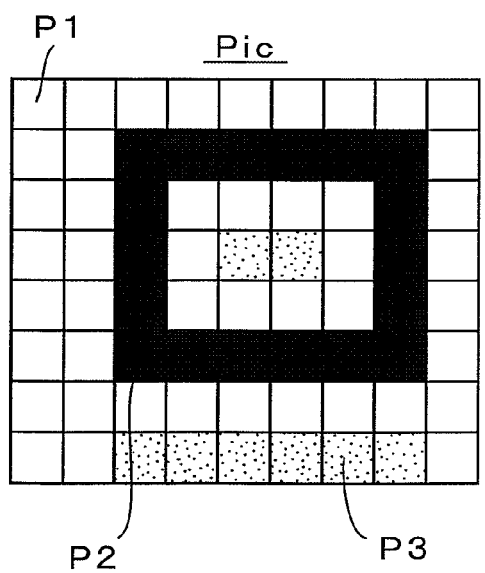
FIG. 20A shows a plan view of a recorded motif using diffraction grating patterns and FIG. 20B shows a plan view of a recording surface Rec.

FIG. 20's show plan views for describing a method for recording a motif using diffraction grating patterns on the recording surface Rec. FIG. 20A is a plan view of an original image Pic to be recorded, which is a two-dimensional image constituted of a pixel array of 8 rows and 9 columns. This two-dimensional image is constituted from the three types of pixels of pixels P1, indicated in white, pixels P2, indicated in black, and pixels P3, indicated by hatching by dots. A simple motif is expressed by the combination of these pixels.

Figure 20B:
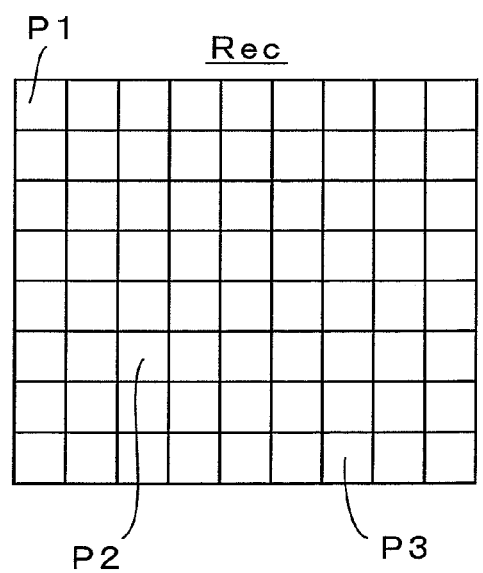

To record the original image Pic, shown in FIG. 20A, in the form of diffraction grating patterns on the recording surface Rec, the same pixel array as that of the original image Pic is defined on the recording surface Rec as shown in FIG. 20B to make the pixels on the recording surface Rec correspond to the pixels on the original image Pic. Diffraction grating patterns, corresponding to the pixel values of the pixels P1, P2, and P3 on the original image Pic, are then recorded in the corresponding pixels P1, P2, and P3 on the recording surface Rec.

Figure 21:
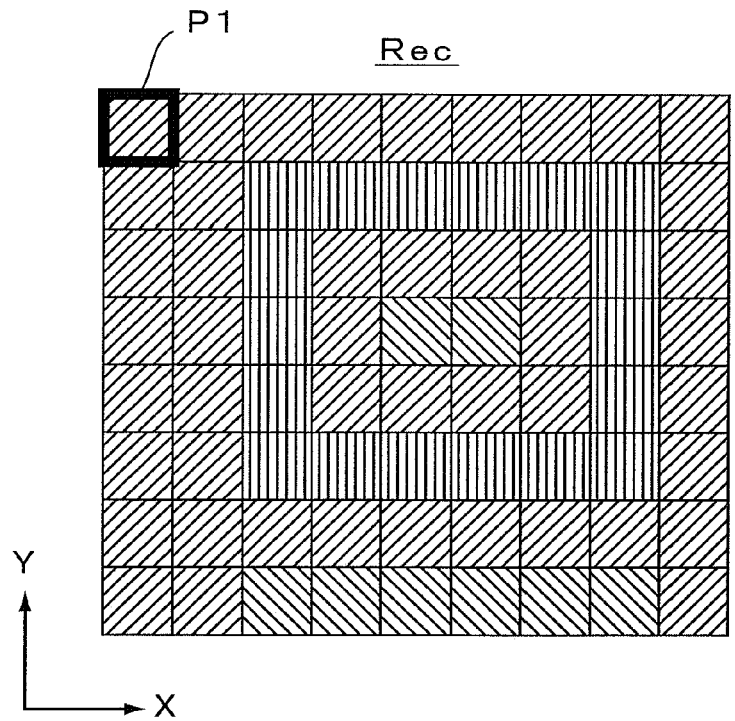
FIG. 21 is a plan view of a state in which a motif has been recorded on the recording surface Rec by using diffraction grating patterns.

FIG. 21 is a plan view of a state in which the motif, corresponding to the original image of FIG. 20A, has been recorded on the recording surface Rec, shown in FIG. 20B, by using diffraction grating patterns. The lines drawn inside each individual pixel shown in FIG. 21 indicate grating lines of a diffraction grating pattern for the sake of description. The grating lines of an actual diffraction grating pattern are recorded at a pitch of the level of the wavelength of visible light and cannot be observed by the naked eye. There are three types of diffraction grating patterns in the individual pixels shown in FIG. 21, and these correspond to the three types of pixels shown in FIG. 20A. That is, at the position of each pixel P1, indicated in white in FIG. 20A, a diffraction grating pattern, having grating lines that are inclined in the upper right to lower left direction, is formed, at the position of each pixel P2, indicated in black in FIG. 20A, a diffraction grating pattern, having grating lines directed in the vertical direction, is formed, and at the position of each pixel P3, indicated by hatching by dots in FIG. 20A, a diffraction grating pattern, having grating lines that are inclined in the upper left to lower right direction, is formed.

By thus recording diffraction grating patterns according to the pixel values of the respective individual pixels of the original image Pic onto the corresponding pixel positions on the recording surface Rec, the motif on the original image Pic can be expressed by diffraction grating patterns. Because the medium, onto which the diffraction grating patterns have been recorded as shown in FIG. 21, is not a normal hologram recording medium, a three-dimensional image cannot be reproduced. However, because diffracted light is directed toward an observation position according to the diffraction grating patterns recorded in the respective individual pixels, the three types of pixels are observed in modes differing from each other, thereby enabling the motif on the original image Pic to be reproduced.

Although the medium shown in FIG. 21 should be called a pseudo hologram, in general, such media are also referred to as holograms, and as mentioned above, are referred to as hologram recording media in the present Application.

Figure 22:
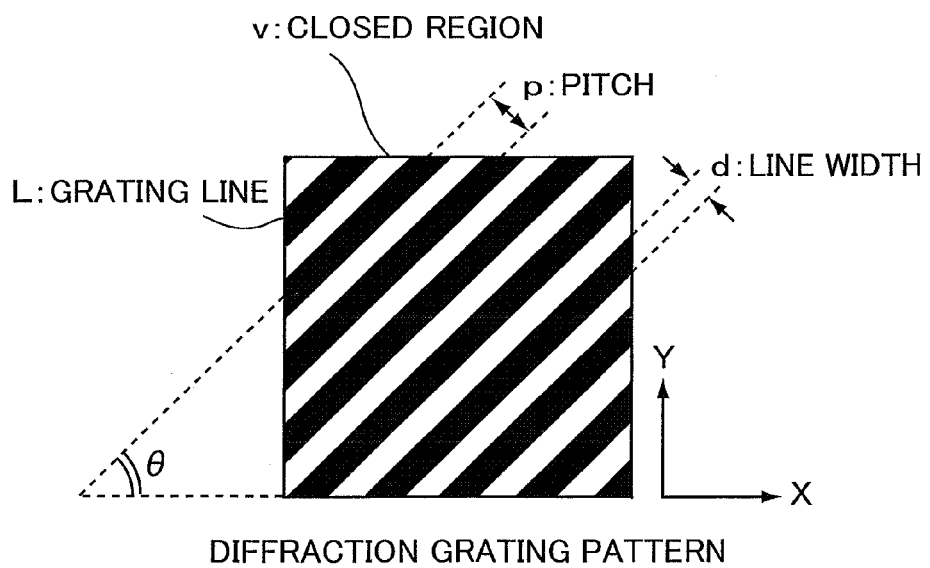
FIG. 22 is an enlarged plan view of a diffraction grating pattern formed in a pixel P1 shown in FIG. 21.

FIG. 22 is an enlarged plan view of the diffraction grating pattern formed in a pixel P1 shown in FIG. 21. A two-dimensional XY coordinate system is indicated in each of FIGS. 21 and 22, and the orientation of the grating lines is defined by a positioning angle θ of the grating lines with respect to the X-axis. With the example shown in FIG. 22, grating lines L (black portions), with a line width d, are positioned inside a closed region v at a positioning angle θ and a pitch p. The three types of diffraction grating patterns shown in FIG. 21 correspond to changing the positioning angle θ of the grating lines in three ways. That is, with the recording medium shown in FIG. 21, the three types of pixels P1, P2, and P3 on the original image, shown in FIG. 20A, are expressed by diffraction grating patterns having three types of positioning angles θ.

Although diffraction grating pattern variations can thus be obtained by changing the positioning angle θ of the grating lines L, diffraction grating pattern variations can also be obtained by changing other parameters. Specifically, different diffraction grating patterns that give rise to different diffraction phenomena can be obtained by changing the line width d and the pitch p of the grating lines L shown in FIG. 22. Also, although with the example shown in FIG. 22, the size of a pixel is made the same as the size of the closed region v, in which the grating lines are formed, by making the size of the closed region v, in which the grating lines are formed, 80%, 60%, 40%, and 20% the size of a pixel, pixels, with which the intensities of the diffracted light are 80%, 60%, 40%, and 20%, respectively, can be formed.

Numerous variations of pixels, each having a diffraction grating pattern formed in the interior, can thus be formed by variously changing the positioning angle θ, line width d, and pitch p of the grating lines L, the size of the closed region v in which the grating lines L are formed, etc. By using such variations to express the variations of the pixel values of pixels on an original image, the motif on the original image can be expressed in the form of diffraction grating patterns.

The correspondence between the unit regions on the recording surface Rec and pixels does not necessarily have to be a one-to-one correspondence. That is, a single unit region defined on the recording surface Rec may be defined as it is to be a single pixel and a specific diffraction grating pattern may be formed therein, or a plurality of pixels may be defined inside a single unit region and a unique diffraction grating pattern may be formed inside each individual pixel. For example, if square unit regions of 20 μm×20 μm in are defined, each unit region of 20 μm×20 μm may be used as it is as a single pixel, or an implementation, in which four pixels, each constituted of a square of 10 μm×10 μm, are defined in a single unit region, is also possible. That is, in determining diffraction grating patterns based on the original image for the respective individual unit regions on the recording surface, one or a plurality of pixels is or are defined in each unit region, corresponding pixels on the original image are determined for these pixels, and diffraction grating patterns inside the respective individual pixels are determined based on the pixel values of the corresponding pixels.

Also, scattering structure patterns may be formed instead of diffraction grating patterns inside the respective individual pixels on the recording surface Rec. As mentioned above, by using diffraction grating patterns, a plurality of types of pixels that appear differently during observation can be prepared by changing the positioning angle θ, line width d, and pitch p of the grating lines L and the size of the closed region v, etc., and the variation of the pixel values of the pixels on the original image can be expressed by these plurality of types of pixels. In other words, as long as a plurality of types of pixels that mutually differ in appearance can be prepared for expressing the variation of the pixel values of the pixels on an original image, these plurality of types of pixels do not have to be formed by diffraction grating patterns.

Scattering structure patterns are patterns with unique light scattering characteristics and, in the present invention, may be used in place of the diffraction grating patterns described above. For example, Japanese Patent Publication No. 2002-328639A and Japanese Patent Publication No. 2002-

333854A disclose methods for forming recording media having unique light scattering characteristics by forming microscopic uneven structures on surfaces. Surfaces of various light scattering characteristics can be formed, for example, by roughening the surfaces of recording media by etching or use of chemicals or by performing microscopic embossing using an electron beam drawing equipment. Thus, by preparing a plurality of types of scattering structure patterns that mutually differ in light scattering characteristics and allocating a specific scattering structure pattern in each pixel on a recording surface Rec according to the pixel value of a pixel on an original image, the information of the original image can be recorded in a manner similar to the above-described case of using diffraction grating patterns.

As described above, in the record pattern preparing step of step S40 in the flowchart of FIG. 3, two types of record pattern preparing method may be employed. In the first method, interference fringe patterns of the object light from the original images and the reference light are prepared, and by employing this method, a normal hologram recording medium that enables a three-dimensional reproduction image to be obtained is prepared. In the second method, predetermined diffraction grating patterns or scattering structure patterns that correspond to pixels on the original images are prepared, and by employing this method, although a three-dimensional reproduction image cannot be obtained, a (pseudo) hologram recording medium that appears to shimmer brightly or has a white, matted appearance is prepared.

Obviously, in recording the two original images onto the medium, one of either of the above-described two methods may be used or both methods may be used in combination. By selecting whether to record each of the two original images in the form of interference fringe patterns or in the form of diffraction grating patterns (or scattering structure patterns); media of the following three modes can be prepared.

In a medium of a first mode, both original images are recorded in the form of interference fringe patterns. To prepare such a medium, in the record pattern preparing step, the first original image, the second original image, and the recording surface are positioned in a three-dimensional space, a predetermined reference light is defined (as mentioned above, reference light that differs according to each original image may be defined), interference fringe patterns of the object light from the first original image and the reference light are determined by computation for the unit regions to which the first record attribute is assigned, and interference fringe patterns of the object light from the second original image and the reference light are determined by computation for the unit regions to which the second record attribute is assigned.

In a medium of a second mode, the first original image is recorded in the form of interference fringe patterns and the second original image is recorded in the form of diffraction grating patterns (or scattering structure patterns). To prepare such a medium, in the record pattern preparing step, the first original image and the recording surface are positioned in a three-dimensional space, a predetermined reference light is defined, and interference fringe patterns of the object light from the first original image and the reference light are determined by computation for the unit regions to which the first record attribute is assigned, and for each unit region to which the second record attribute is assigned, one or a plurality of pixels is or are defined in the unit region, a corresponding pixel or pixels on the second original image is or are determined for the defined pixel or pixels, and a diffraction grating pattern or a scattering structure pattern in each individual defined pixel is determined based on the pixel value of the corresponding pixel.

In a medium of a third mode, both original images are recorded in the form of diffraction grating patterns or scattering structure patterns. To prepare such a medium, in the record pattern preparing step, for each unit region to which the first record attribute is assigned, one or a plurality of pixels is or are defined in the unit region, a corresponding pixel or pixels on the first original image is or are determined for the defined pixel or pixels, and a diffraction grating pattern or a scattering structure pattern in each individual defined pixel is determined based on the pixel value of the corresponding pixel, and for each unit region to which the second record attribute is assigned, one or a plurality of pixels is or are defined in the unit region, a corresponding pixel or pixels on the second original image is or are determined for the defined pixel or pixels, and a diffraction grating pattern or a scattering structure pattern in each individual defined pixel is determined based on the pixel value of the corresponding pixel.

With the present invention, the original images to be recorded may be two-dimensional images- or three-dimensional images. Thus, in the "original image preparing step" of step S10, it suffices that digital data expressing a two-dimensional image or a three-dimensional image be prepared as an original image. Obviously, an original image, prepared as a two-dimensional image, may be recorded in the form of interference fringe patterns or recorded in the form of diffraction grating patterns or scattering structure patterns. Likewise, an original image, prepared as a three-dimensional image, may be recorded in the form of interference fringe patterns or recorded in the form of diffraction grating patterns or scattering structure patterns. In other words, it suffices that, in the "record pattern preparing step" of step S40, a process, in which a record pattern of some form is prepared by determining (any of) interference fringe patterns, diffraction grating patterns, or scattering structure patterns based on an original image of some form, is performed.

An implementation, in which an empty image without an actual entity is prepared as one of the original images in the "original image preparing step" of step S10 and no pattern whatsoever is formed for unit regions that have been assigned the record attribute of this empty image, is also possible. For example, by using an empty image without an actual entity as an original image Pic(B) in place of the original image Pic(B) shown in FIG. 4B, a reproduction image, in which just the automobile motif, corresponding to the original image Pic(A) shown in FIG. 4A, gradually fades out in space, can be obtained.

<<<Section 4. Various Variations>>>

Although the embodiments that have been described thus far are basically examples, in which two original images are recorded onto the same medium to provide an effect of blending of boundary portions of the motifs of the two original images as in the example shown in FIG. 2, the hologram recording medium preparing method according to the present invention is not necessarily restricted to a method for recording two original images.

For example, the basic philosophy of the art of the present invention can be applied to a case of recording a single original image. That is, in a case of recording a specific original image singularly, an original image preparing step of preparing, as data, the specific original image to be recorded, a unit region defining step of defining and positioning a plurality of unit regions, each having an adequate area for recording interference fringes of visible light, on a hologram recording surface, an attribute assigning step of assigning a "specific record attribute, which indicates that the prepared specific original image is to be recorded," to a portion of the defined plurality of unit regions; a record pattern preparing step of determining, for each unit region assigned with the specific record attribute, an interference fringe pattern, a diffraction grating pattern, or a scattering structure pattern based on the prepared specific original image to prepare data indicating a predetermined record pattern to be formed on the recording surface, and a medium forming step of forming the prepared record pattern on a physical medium are executed.

In particular, because with the present invention, a gradated motif expression is enabled, in a case where a gradated motif expression is to be carried out in recording a specific original image singularly, an original image preparing step of preparing, as data, the specific original image to be recorded, a unit region defining step of defining and positioning a plurality of unit regions, each having an adequate area for recording interference fringes of visible light, on a hologram recording surface, an attribute assigning step of defining a gradation pattern, expressing that an appearance probability of a predetermined attribute gradually changes in space, and assigning a "specific record attribute, which indicates that the prepared specific original image is to be recorded," to a portion of the defined plurality of unit regions that is selected according to the appearance probability at each individual position when the gradation pattern is overlapped onto the recording surface, a record pattern preparing step of determining, for each unit region assigned with the specific record attribute, an interference fringe pattern, a diffraction grating pattern, or a scattering structure pattern based on the prepared specific original image to prepare data indicating a predetermined record pattern to be formed on the recording surface, and a medium forming step of forming the prepared record pattern on a physical medium are executed.

Also, if a plurality M of original images are to be recorded on the same medium, an original image preparing step of preparing, as data, the plurality M of original images to be recorded, a unit region defining step of defining and positioning a plurality of unit regions, each having an adequate area for recording interference fringes of visible light, on a hologram recording surface, an attribute assigning step of defining a gradation pattern for each of the M original images, respectively, which expresses that an appearance probability of a record attribute corresponding to an original image gradually changes in space, and assigning any one of record attributes to each unit region according to appearance probabilities of the respective record attributes at each individual position when the respective gradation patterns are overlapped onto the recording surface, a record pattern preparing step of determining, for each individual unit region, an interference fringe pattern, a diffraction grating pattern, or a scattering structure pattern based on a specific original image corresponding to an assigned record attribute to prepare data indicating a predetermined record pattern to be formed on the recording surface, and a medium forming step of forming the prepared record pattern on a physical medium are executed.

Although in Section 1 to Section 3, specific embodiments for cases of M=2 were described, the present invention can also be applied likewise to cases of M=3 or more. For example, if the present invention is carried out by setting M=12 and preparing a total of 12 original images and forming a layout, in which the respective original images are positioned at positions of the respective numerals of a clock face, an effect such that the 12 original images are blended with each other at a central position of this clock face is obtained.

A hologram recording medium, prepared by applying the present invention to a plurality M of original images, thus has a unique structure having a recording surface, on which a plurality of unit regions, each having an adequate area for recording interference fringes of visible light, are defined, and with this structure, image information concerning one original image, among the plurality M of original images, is recorded as an interference fringe pattern, a diffraction grating pattern, or a scattering structure pattern in each unit region, and appearance probabilities of unit regions, in which image information concerning the respective original images are recorded, change in space.

In particular, a hologram recording medium that is obtained with the setting of M=2 has, as in the embodiment shown in FIG. 2, a unique structure having a recording surface, on which a plurality of unit regions, each having an adequate area for recording interference fringes of visible light, are defined, and with this structure, either image information concerning a first original image or image information concerning a second original image is recorded as an interference fringe pattern, a diffraction grating pattern, or a scattering structure pattern in each unit region, and an appearance probability of unit regions, having a first record attribute and in which image information concerning the first original image is recorded, and an appearance probability of unit regions, having a second record attribute and in which image information concerning the second original image is recorded, gradually change in space.

<<<Section 5. Hologram Recording Medium Preparing Device>>>

Figure 23:
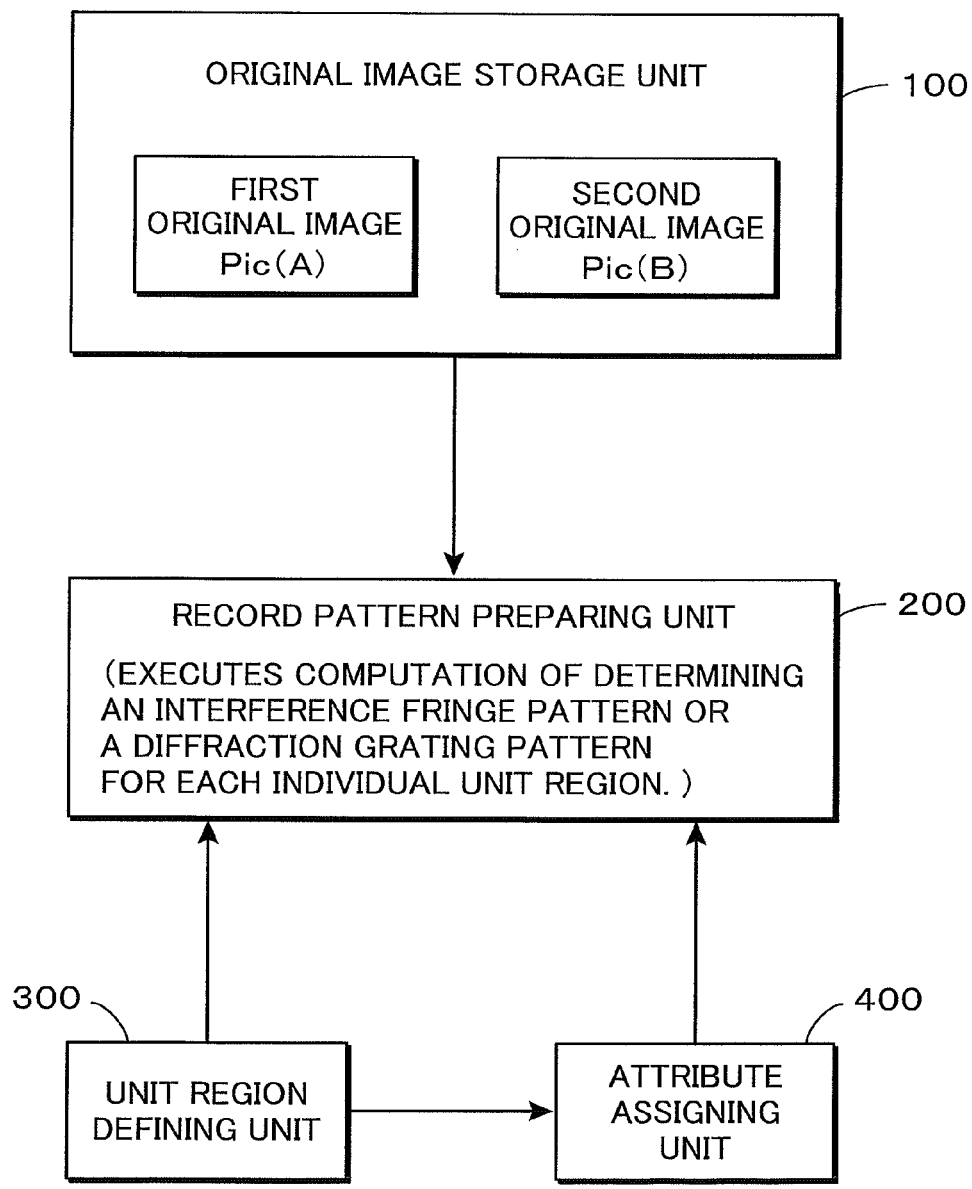
FIG. 23 is a block diagram of a basic arrangement of a hologram recording medium preparing device according to the present invention.

FIG. 23 is a block diagram of a basic arrangement of a hologram recording medium preparing device according to the present invention. As illustrated, this device includes an original image storage unit 100, a record pattern preparing unit 200, a unit region defining unit 300, and an attribute assigning unit 400. The original image storage unit 100 is a component that stores, as data, a plurality M of original images to be recorded, and in the figure, a state, in which two original images of a first original image Pic(A) and a second original image Pic(B) are stored as data, is illustrated. Meanwhile, the unit region defining unit 300 is a component with a function of defining and positioning a plurality of unit regions, each having an adequate area for recording interference fringes of visible light, on a hologram recording surface Rec. This unit region defining unit 300 can be realized, for example, by a component that, upon determining the length of one side of each unit region based on an operator input, performs a process of automatically generating an array, with which each single cell is a square that is in accordance with the determined length.

Meanwhile, the attribute assigning unit 400 executes a process of preparing a "gradation pattern, which is defined for each of the M original images stored in the original image storage unit 100 and expresses that an appearance probability of a record attribute corresponding to the original image, gradually changes in space" (this may be prepared based on operator inputs as well) and assigning a record attribute to each unit region according to the appearance probabilities of the respective record attributes at each position when the gradation pattern is overlapped onto the recording surface Rec. The specific details of the record attribute assigning process are as have been described above.

The record pattern preparing unit 200 is a component that determines, for each individual unit regions on the recording surface Rec, an interference fringe pattern, a diffraction grating pattern, or a scattering structure pattern based on the specific original image corresponding to the assigned record attribute to prepare data indicating a predetermined record pattern to be formed on the recording surface Rec.

The device shown in FIG. 23 can be realized in actuality by incorporating a predetermined program in a computer. This program is a program for executing the process of the "attribute assigning step" of step S30 and the "record pattern preparing step" of step S40 based on digital data, expressing original images and prepared in the "original image preparing step" of step S10, and digital data, expressing unit regions defined in the "unit region defining step" of step S20.

What is claimed is:

1. A hologram recording medium preparing method comprising:
   an original image preparing step of preparing, as data, a plurality M of original images to be recorded;
   a unit region defining step of defining and positioning a plurality of unit regions, each having an adequate area for recording interference fringes of visible light and a dimension of each being no more than 300 µm on a hologram recording surface, said plurality of unit regions having a same size and same rectangular shape and arrayed in a form of a two-dimensional matrix;
   an attribute assigning step of assigning a specific record attribute, which indicates that any one of said plurality M of original images is to be recorded, to each of the plurality of unit regions;
   a record pattern preparing step of determining, for each individual unit region, an interference fringe pattern, a diffraction grating pattern, or a scattering structure pattern based on an original image corresponding to an assigned record attribute, respectively, to prepare data indicating a predetermined record pattern to be formed on the recording surface so that each of said original images is recorded in a plurality of unit regions, respectively, wherein an interference fringe pattern is to be formed for at least one original image; and
   a medium forming step of forming the record pattern on a physical medium;
   wherein an original image for which an interference fringe pattern is to be formed is located at a position away from said hologram recording surface and comprises a plurality of point light sources to be recorded.

* * * * *